United States Patent
Salicunaj

(10) Patent No.: US 12,172,844 B2
(45) Date of Patent: Dec. 24, 2024

(54) DIRECT DRIVE DRUM FOR A MODULAR CONVEYOR BELT

(71) Applicant: Habasit Italiana S.p.A., Cesano Boscone, R&D Plastics, Zweigniederlassung Reinach/BL (Schweiz), Reinach (CH)

(72) Inventor: Albert Salicunaj, Reinach (CH)

(73) Assignee: Habasit Italiana S.p.A., Cesano Boscone, R&D Plastics, Zweigniederlassung Reinach/BL (Schweiz), Reinach (CH)

( * ) Notice: Subject to any disclaimer, the term of this patent is extended or adjusted under 35 U.S.C. 154(b) by 186 days.

(21) Appl. No.: 18/002,032

(22) PCT Filed: Jun. 9, 2021

(86) PCT No.: PCT/EP2021/065514
§ 371 (c)(1),
(2) Date: Dec. 15, 2022

(87) PCT Pub. No.: WO2021/254854
PCT Pub. Date: Dec. 23, 2021

(65) Prior Publication Data
US 2023/0257205 A1    Aug. 17, 2023

(30) Foreign Application Priority Data
Jun. 15, 2020  (EP) .................................. 20180034

(51) Int. Cl.
*B65G 21/18*     (2006.01)
*B65G 17/08*     (2006.01)

(52) U.S. Cl.
CPC ............. *B65G 21/18* (2013.01); *B65G 17/08* (2013.01)

(58) Field of Classification Search
CPC ................................ B65G 17/08; B65G 21/18
USPC ......................................................... 198/778
See application file for complete search history.

(56) References Cited

U.S. PATENT DOCUMENTS

| 4,852,720 A | * | 8/1989 | Roinestad | B65G 23/34 |
| | | | | 198/833 |
| 4,901,844 A | * | 2/1990 | Palmaer | B65G 17/086 |
| | | | | 198/852 |
| 4,944,162 A | | 7/1990 | Ang et al. | |

(Continued)

FOREIGN PATENT DOCUMENTS

| WO | 2013/142136 A1 | 9/2013 |
| WO | 2016/179697 A1 | 11/2016 |

*Primary Examiner* — Gene O Crawford
*Assistant Examiner* — Lester Rushin, III
(74) *Attorney, Agent, or Firm* — Hodgson Russ LLP

(57) ABSTRACT

A direct drive drum (100) for a modular conveyor belt (180) comprises a drum rotation axis, a plurality of support elements (110) and a plurality of direct drive elements (120). Each support element (110) has a belt support surface (111) on a side distant and pointing away from the drum rotation axis. Each direct drive element (120) is arranged in circumferential direction (106) of the direct drive drum separate and in a distance from each of the support elements (110). In this way, the tension generated within the modular conveyor belt (180) and between the modular conveyor belt (180) and the direct drive drum (100) in a collapse phase of the modular conveyor belt (180) can be reduced.

17 Claims, 20 Drawing Sheets

(56) References Cited

U.S. PATENT DOCUMENTS

| | | | | |
|---|---|---|---|---|
| 5,375,695 | A * | 12/1994 | Daringer | B65G 21/18 |
| | | | | 198/848 |
| 11,365,058 | B2 * | 6/2022 | Neely | B65G 17/086 |
| 11,383,932 | B2 | 7/2022 | Talsma et al. | |
| 2017/0022012 | A1 | 1/2017 | Neely et al. | |
| 2018/0273301 | A1 * | 9/2018 | Breton | B65G 21/18 |
| 2018/0290833 | A1 | 10/2018 | Neely et al. | |
| 2019/0308817 | A1 | 10/2019 | Neely et al. | |
| 2020/0399067 | A1 | 12/2020 | Talsma et al. | |

* cited by examiner

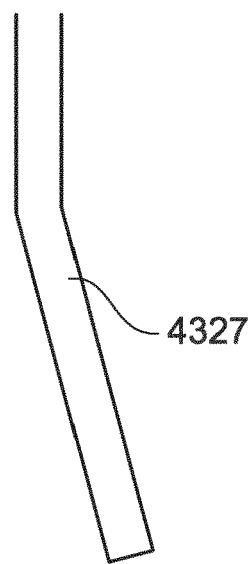 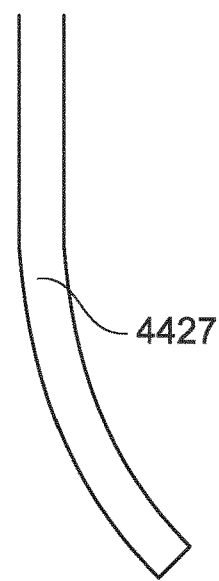
Fig. 46   Fig. 47
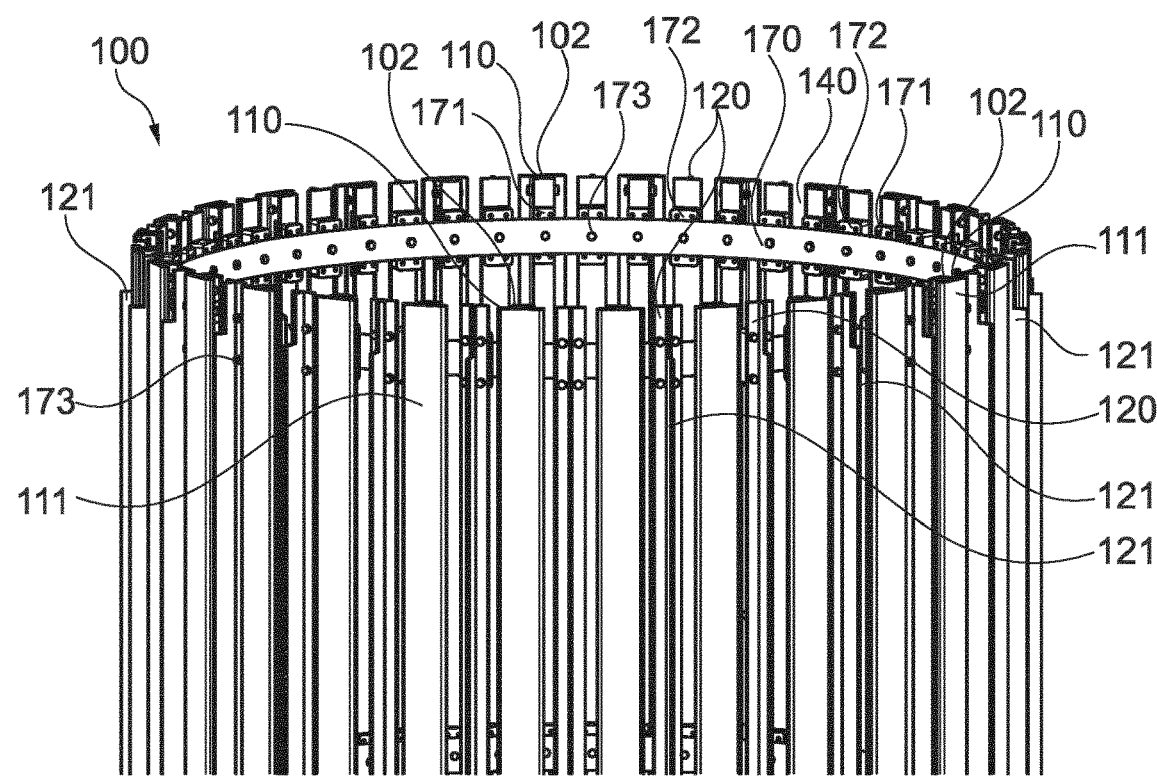
Fig. 48

DIRECT DRIVE DRUM FOR A MODULAR CONVEYOR BELT

The present invention relates to a direct drive drum for a modular conveyor belt and a conveyor system comprising such a direct drive drum and a modular conveyor belt.

From US 2017/0022012 A1 and the related patent application publications US 2018/0290833 A1 and US 2019/0308817 A1 positive drive systems, also known as direct drive systems, for spiral conveyor belts are known, in which drive elements—in particular in the form of contoured ribs and cage bars forming part of a drive drum—engage and drive the modular conveyor belt, but also support the same. The drive drum can also include a continuous, circumferential ring that extends between the terminus of the ribs and the entrance end of the drum, thereby connecting the drive elements and providing a belt support surface.

WO 2013/142136 A1 discloses similar positive drive systems, in which combined drive and support elements engage, drive and support the modular conveyor belt. Additional support elements may be arranged between these combined drive and support elements.

A technical problem encountered with such known positive or direct drive systems when used to drive a modular conveyor belt (in this context "modular" means made up of a plurality of individual belt modules) is the creation of unwanted tension in the modular conveyor belt as they do not allow for sufficient slippage between the drive drum and the conveyor belt. Such tension particularly occurs during a change of direction of movement or belt travel for the modular conveyor belt.

When the direct drive drum forces the conveyor belt from a linear into a circular direction of belt travel, namely circumferentially around the direct drive drum such as in a spiral conveyor system, the individual belt modules of the modular conveyor belt are forced to move closer together towards their (inner) ends which are proximate to and supported by the direct drive drum and to move apart towards their (outer) ends which are distant to the direct drive drum. Thus, during this "collapse phase" the distance between individual belt modules of the conveyor belt needs to change, while the distance between individual drive elements of the drive drum (the drive elements engaging the conveyor belt at or between its individual belt modules) remains constant. The individual belt modules are forced together and apart at the same time, hence generating tension within the modular conveyor belt and between the modular conveyor belt and the direct drive drum.

When the modular conveyor belt, on leaving the direct drive drum in a disengagement phase, changes from a circular to a linear direction of belt travel, the individual belt modules need to re-align and come off the outer surface, in particular the drive elements of the direct drive drum, which generates tension as well. Sometimes the tension at the exit also is too low and should be increased slightly.

Therefore, it is an object of the invention to provide a direct drive drum better controlling the tension generated within the modular conveyor belt in particular in a collapse phase of the modular conveyor belt, advantageously also in a disengagement phase of the modular conveyor belt.

This object is met by providing a direct drive drum for a modular conveyor belt according to independent claim 1 and a conveyor system comprising such a direct drive drum according to independent claim 14. Independent claim 16 defines a method of manufacturing a direct drive drum for a modular conveyor belt. Particularly advantageous embodiments of the invention result from the dependent claims.

The core of the invention lies in the following: A direct drive drum for a modular conveyor belt comprises a drum rotation axis, a plurality of support elements, each support element having a belt support surface on a side distant and pointing away from the drum rotation axis, and a plurality of direct drive elements. Each direct drive element is arranged in circumferential direction of the direct drive drum separate and in a distance from each of the support elements.

It has been found that the tension during the collapse phase can be reduced or even be avoided by separating on the direct drive cage or direct drive drum of the spiral conveyor system (in circumferential direction or direction of rotation of the direct drive cage or drum) direct drive elements (e.g. comprising drive ribs) from support elements (e.g. realised as cage bars or as additional belt support bars or sheets on the cage or cage bars). Hence, it was found to be advantageous to separate (in circumferential direction or direction of rotation of the direct drive cage or drum) the support function from the drive function by having a first plurality of elements for executing the support function and a second plurality of elements for executing the drive function, with the second plurality of elements being different and spatially separated from the first plurality of elements.

It has also been found that during the disengagement phase the forces transmitted from the direct drive drum onto the modular conveyor belt can advantageously be reduced and the re-alignment of belt modules be facilitated by a separation (in circumferential direction or direction of rotation of the direct drive cage or drum) of the support function from the direct drive function of individual elements on the direct drive drum, and thus by a reduction of the number of direct drive elements engaging the modular conveyor belt. Reducing the number of direct drive elements engaging the modular conveyor belt reduces the adherence of the modular conveyor belt to the direct drive drum and hence facilitates the release of the modular conveyor belt from the direct drive drum.

A direct drive drum according to the invention is a drive drum which directly or positively engages a modular conveyor belt by pushing against at least one of the belt modules of the modular conveyor belt rather than relying solely on friction between the direct drive drum and the at least one belt module of the modular conveyor belt.

A modular conveyor belt according to the invention is a conveyor belt which comprises (individual) belt modules, whereby adjacent belt modules are connected to each other. In a radius or spiral (modular) conveyor belt the interconnection of the belt modules is such that the belt modules can turn or twist relative to each other at least to some degree in two directions perpendicular to the direction of belt travel: For example, adjacent belt modules can be connected by intercalating link ends, whereby the intercalating link ends are linked by a pivot rod extending through slots in the link ends, the slots allowing the pivot rod to move to some extent in the direction of belt travel and in the opposite direction thereby forming a somewhat flexible connection, i.e. allowing the belt modules to somewhat move relative to each other.

The direct drive drum may engage the modular conveyor belt by direct drive elements protruding in free spaces between two adjacent belt modules, e.g. in a gap, notch or a groove between two adjacent belt modules of the modular conveyor belt.

A free space between two adjacent belt modules may also be provided between two protrusions or cams extending from those ends of the belt modules which face the direct drive drum and its outermost surface. The direct drive drum engages the conveyor belt by engaging at least one of the cams extending from the belt modules, e.g. by pushing against at least one of the cams extending from the belt modules. Some cams may be in contact with belt support surfaces of the support elements of the direct drive drum in certain phases. A belt module at its drum facing end may have one or more cams, preferably one or two cams, most preferably one cam. The cam(s) may be the only part(s) of each belt module which is/are in direct contact with and thus supported by the belt support surface of a support element of the direct drive drum.

The direct drive drum comprises a drum rotation axis around which the direct drive drum rotates or revolves when driving the modular conveyor belt. The drum rotation axis is a geometric or imaginary rotation axis which is the geometric middle axis extending through the centre of each of the (imaginary) top and bottom circular areas of the drum and over the entire height of the drum. For instance, the rotation axis (or axis of rotation) may not be a mechanical part or element in case the direct drive drum is mounted on and supported by and/or driven by a turntable (e.g. featuring a circumferential gear rim), drive disk or cog wheel. However, the direct drive drum may have a rotation axis in the form of a mechanical part which is used to support and/or drive the direct drive drum, e.g. with one or more bearings, sprockets and/or cog wheels attached to one or both ends of the rotation axis.

A support element according to the invention is a structural part (forming part of the surface structure of the direct drive drum) and has a belt support surface which is directed outwardly, in a radial direction away from the drum rotation axis, and thereby contacts and supports the modular conveyor belt at a given point in time. The belt support surface may form part of the outermost surface of the direct drive drum. A support element can have different shapes, e.g. a rectangular shape or a rod shape. The length of a support element (along its longest or longitudinal axis) is several times larger than its width or diameter, e.g. its ratio of length:width or length:diameter is from 5:1 to 100:1, preferably from 10:1 to 100:1, more preferably from 10:1 to 25:1. The width or diameter of a support element is usually from 30 mm to 150 mm. The length of a support element can be up to 8 m or more, depending on the height of the direct drive drum. An arrangement in which each support element extends (with its longitudinal axis) upwards from a lower support end to an upper support end (so that the length of a support element defines the height of the direct drive drum or a part thereof) is preferred. A support element may have one or more chamfered edges not serving as part of the belt support surface. In a particular position along the circumference of the direct drive drum there may be a single support element extending all the way between the bottom and the top of the direct drive drum, but alternatively such position may be taken by two or more separate support elements lined up between the bottom and the top of the direct drive drum. Such separate support elements may be arranged adjacent to each other, whereby two adjacent support elements may touch each other or be separated, e.g. with a gap or a sealing between them.

The lower support end may be at the same level as the bottom or bottom end of the direct drive drum, or may be near the bottom of the direct drive drum in case the direct drive drum has a bottom part which does not comprise any of the support elements and/or direct drive elements used to support, engage and drive the modular conveyor belt, but instead comprises other parts, e.g. parts to mount, support and/or drive the direct drive drum, such as a turntable (e.g. featuring a circumferential gear rim), drive disk, cog wheels, sprockets and/or bearings.

The upper support end may be the top or top end of the direct drive drum, or may be near the top of the direct drive drum in case the direct drive drum has a top part which does not comprise any of the support elements and/or direct drive elements used to support, engage and drive the modular conveyor belt, but instead comprises other parts, such as a turntable (e.g. featuring a circumferential gear rim), drive disk, cog wheels, sprockets and/or bearings.

A direct drive element is a structural part (forming part of the surface structure of the direct drive drum), e.g. a rib, edge or bar, which functions as a drive element by engaging the modular conveyor belt by temporarily inserting itself or a part thereof into a free space between two adjacent belt modules, e.g. in a gap, notch or groove between two adjacent belt modules of the modular conveyor belt.

In a particular position along the circumference of the direct drive drum there may be a single direct drive element extending all the way between the bottom and the top of the direct drive drum, but alternatively such position may be taken by two or more separate direct drive elements lined up between the bottom and the top of the direct drive drum. Such separate direct drive elements may be arranged adjacent to each other, whereby two adjacent direct drive elements may touch each other or be separated, e.g. with a gap or a sealing between them.

A simple and efficient way—from the perspective of reducing the complexity of the design of the belt modules and amount of material needed for manufacturing the belt modules and thus cost—of engaging the modular conveyor belt is to use a gap between the long edges or a section thereof of two adjacent belt modules, the long edges of the belt modules normally running across or at an angle of from 70° to 90° to the direction of belt travel. In this case the drive element, e.g. a rib, edge or bar should be sufficiently narrow, i.e. have a width small enough or smaller than the width of said gap in order to be able to engage the belt modules in said gap by (at least partially) inserting itself into the gap.

Alternatively, the free space between two adjacent belt modules may also be provided between two protrusions or cams extending from those ends of the belt modules which face the direct drive element and/or the direct drive drum and/or its outermost surface. In this case the direct drive element engages the conveyor belt by engaging one of the protrusions or cams extending from each of the belt modules, e.g. by pushing against the protrusion or cam.

The cams may be in contact with the belt support surfaces of the support elements of the direct drive drum. At its drum facing end each belt module may have one or more cams, preferably one or two cams, most preferably one cam. The cam(s) may be the only part(s) of each belt module which is/are in direct contact with and thus supported by one or at least one support surface of the support elements of the direct drive drum.

Thus, a direct drive element directly drives the modular conveyor belt by engaging its belt modules and not by friction or frictional force transmission. In order to engage a belt module a direct drive element may extend in a radial direction away from the drum rotation axis and protrude beyond an adjacent support element. This means that the protrusion (height) of a direct drive element extends at least beyond the level of the belt support surface of an adjacent support element, which has the advantage of a direct force transmission compared to a frictional force transmission involving frictional losses.

However, a direct drive element does not need to protrude beyond the level of the support surface of an adjacent support element over the entire height or distance between the bottom and the top of the direct drive drum, or over the entire length of the direct drive element. Rather, it is advantageous if a direct drive element protrudes as described before only in certain sections of the direct drive drum, such as the engagement section and the direct drive section, and does not protrude in other sections of the direct drive drum, such as the collapse section and the disengagement section, i.e. those sections in which slippage or a certain amount of slippage of the modular conveyor belt is desired or should be allowed for in order to prevent (too much) tension within the modular conveyor belt.

One or more separate sections of the direct drive drum may be defined. A section of the direct drive drum is a portion of the direct drum which extends vertically or in a vertical direction over a certain part of the height of the direct drive drum, i.e. along and/or parallel to the drum rotation axis, and extends circumferentially or in a circumferential direction all the way around the direct drive drum; the section can therefore also be more precisely called a "height section" or "vertical section". In a particular circumferential position of the direct drive drum, a section of the direct drive drum may comprise a certain portion or section of a support element or a direct drive element in the longitudinal direction of the element in case the element extends in one piece from the bottom to the top of the direct drive drum or vice versa, or one or more support elements or direct drive elements in the direction from the bottom to the top of the direct drive drum or vice versa in case of using several separate elements over the entire height of the direct drive drum.

Within a section of the direct drive drum, a support element may have one or more specific properties different from a support element of the rest of the direct drive drum or within at least one other section thereof. Within a section, a direct drive element may have one or more specific properties different from a direct drive element of the rest of the direct drive drum or within at least one other section thereof. For instance, said properties may be the size or dimensions (length, width, height) of the support element and/or direct drive element, in particular the position such as the angle between the belt support surface and the drum rotation axis or vertical axis, and/or the height or protrusion height of a direct drive element or its drive rib.

In one preferred aspect of the invention the plurality of support elements defines an outermost circumferential belt support surface of the direct drive drum.

This arrangement advantageously enables a direct contact of the direct drive drum with the modular conveyor belt and a rotational symmetric design of the direct drive drum, which ensures a smooth driving of the modular conveyor belt by rotation of the direct drive drum and avoids lateral movements of the modular conveyor belt out of the direction of belt travel.

The outermost circumferential belt support surface of the direct drive drum is the outermost circumferential drum surface which supports the modular conveyor belt and thus corresponds to the sum of the belt support surfaces of the support elements.

One or more of the following geometries of and/or between the support elements and direct drive elements contribute to an advantageously even or equal distribution of force applied to the direct drive drum and/or the modular conveyor belt:

(i) (the longitudinal axis of) a support element extends along a straight or curved line from a bottom part, a bottom section or bottom end of the direct drive drum to a top part, a top section or top end of the direct drive drum;

(ii) a support element extends together with other support elements along a straight or curved line from a bottom part, a bottom section or bottom end of the direct drive drum to a top part, a top section or top end of the direct drive drum;

(iii) (the longitudinal axis of) a direct drive element extends along a straight or curved line from a bottom part, a bottom section or bottom end of the direct drive drum to a top part, a top section or top end of the direct drive drum;

(iv) a direct drive element extends with other direct drive elements along a straight or curved line from a bottom part, a bottom section or bottom end of the direct drive drum to a top part, a top section or top end of the direct drive drum;

(v) (the longitudinal axis of) each direct drive element extends parallel to (the longitudinal axis of) each support element (following or preceding the direct drive element in a circumferential direction of the direct drive drum);

(vi) the longitudinal axis of each direct drive element extends parallel to the longitudinal axis of the straight section of each support element (following or preceding the direct drive element in a circumferential direction of the direct drive drum);

(vii) the support elements and the direct drive elements are arranged so that the longitudinal axes of the straight sections of the support elements (i.e. the sections not bent like in a skirt section of the direct drive drum) and the longitudinal axes of the direct drive elements are aligned coaxially with the drum rotation axis;

(viii) a direct drive element extends equidistant to two adjacent support elements either side the direct drive element over the entire length of said elements;

(ix) the support elements and the direct drive elements are arranged rotationally symmetrical around the drum rotation axis; and/or (x) the plurality of support elements and the plurality of direct drive elements together form a circle or a regular polygon, the geometric centre of the circle or the regular polygon being on the drum rotation axis.

Advantageously, both the support elements and the direct drive elements are arranged in circumferential direction of the direct drive drum according to the invention in an alternating sequence with each support element followed next by 1 to 5 direct drive elements, preferably one direct drive element, and with each direct drive element followed next by 1 to 5 support elements, preferably one support element.

Such an alternating sequence of the support elements and drive elements ensures a stabilised and smooth way of driving the modular conveyor belt in that the modular conveyor belt is sufficiently supported and driven at the same time, thereby avoiding jerky movements of the modular conveyor belt in the direction of belt travel and/or lateral movements of the modular conveyor belt out of the direction of belt travel.

The support elements and the direct drive elements are advantageously arranged in circumferential direction of the direct drive drum with an interspace between two subsequent elements having a width being equal to or less than the width of one of the support elements, but at least the width of one of the drive elements (to allow for some free movement of consecutive belt modules relative to each other and a compact arrangement of the elements leading to a compact design of the direct drive drum).

A support element of the plurality of support elements may be a bar or a plate and have a belt support surface on a side distant and pointing away from the drum rotation axis, wherein the belt support surface may be preferably a flat surface or a convex surface. An advantage of this aspect of the invention is that the support element improves the guidance and/or support of the modular conveyor belt, whereby a flat surface or a convex surface distributes the contact or support pressure so as to minimise the mechanical load or stress on the modular conveyor belt, the support element itself and the direct drive drum; it takes the load of the modular conveyor belt acting in a direction towards the drum rotation axis and the circumferential surface of the direct drive drum away from the direct drive elements. This enables the direct drive elements to be designed more specifically for engaging the direct drive drum, e.g. featuring a drive rib or ridge which is relatively narrow and thus lends itself for engaging the modular conveyor belt in a (narrow) gap, e.g. between two modules, but less so for supporting the modular conveyor belt or individual modules thereof.

A support element of the plurality of support elements may be designed as a bar, in particularly a T-bar, a plate or a sheet. The support element may be made of a plastic material or metal, preferably a plastic material. Preferred is a plastic bar, in particular a plastic T-bar, a plastic plate or a plastic sheet. A support element preferably features a belt support surface pointing away from the drum rotation axis, particularly pointing towards the modular conveyor belt, for supporting and/or guiding the modular conveyor belt. The belt support surface may be made of or comprise a plastic material or metal, preferably a plastic material, while the rest of the support element may be made of metal. Suitable plastic materials are wear resistant plastic materials such as polyacetals, polycarbonates, HDPE (high density polyethylene), polyamides, PEEK (poly ether ketone) and UHMW-PE (ultra-high molecular weight polyethylene).

A direct drive element of the plurality of direct drive elements may comprise a drive rib extending in a radial direction away from the drum rotation axis and/or protruding beyond an adjacent support element over at least a section of the direct drive drum. An advantage of this aspect of the invention is that the direct drive element is designed more specifically for engaging the modular conveyor belt, e.g. featuring a drive rib which is relatively narrow and thus lends itself for engaging the modular conveyor belt in a (narrow) gap, e.g. between two belt modules. A design selected from the group consisting of a blade, an edge, a ridge, a cog, a T-bar and a row of rod tips may be chosen instead of a drive rib and to the same effect. In order to improve or optimise engagement with the modular conveyor belt a direct drive element may advantageously be tapered in a direction away from the drum rotation axis.

Advantageously, none of the direct drive elements comprises a belt support surface on a side distant and pointing away from the drum rotation axis.

A direct drive element or at least its drive rib or surface thereof may be made of a plastic material (polymer) or metal, preferably a metal, most preferably steel. A direct drive element can also advantageously be made from a combination of plastic and steel in order to balance durability against a reduction of friction and/or cost. A particularly advantageous combination of materials is to use steel for the engagement section (in order to increase durability in this section exposed to an increased level of mechanical wear) and plastic further upwards, especially in the direct drive section (in order to reduce friction). The direct drive section is usually larger or even much larger than the engagement section in terms of the height section of the direct drive drum covered by its support elements and direct drive elements. Hence a longer or even much longer section of the modular conveyor belt is in contact with the direct drive section than with the engagement section at any given time. With the same material of the direct drive elements in both sections, this would cause considerably more friction between the direct drive drum and the modular conveyor belt in the direct drive section than in the engagement section. The higher amount of friction in the direct drive section can be reduced or compensated for by using a different material for the direct drive elements or at least their drive ribs or the surfaces thereof in the direct drive section than in the engagement section, said material having a lower friction coefficient in relation to the modular conveyor belt, such as e.g. a plastic material.

In some sections of the direct drive drum a direct drive element may be fully (i.e. over the entire height of the rib), partially (i.e. over only a part of the height of the rib) or not protruding beyond an adjacent support element. In some sections of the direct drive drum the amount of protrusion, i.e. the protrusion height, may change, i.e. increase and/or decrease.

In case the direct drive element protrudes beyond an adjacent support element over at least a section of the direct drive drum, the direct drive element preferably protrudes, in particular with a protrusion height, beyond the belt support surface of an adjacent support element over at least a section of the direct drive drum.

The direct drive drum according to the invention may comprise a lower skirt section extending upwards from a lower support end of the direct drive drum, the skirt section comprising a skirt section top end at a height lower than an upper support end of the direct drive drum, wherein in the skirt section the belt support surfaces of the support elements are arranged at an angle (skirt angle, slope angle) with respect to the drum rotation axis of from 0.5° to 30°, preferably of from 0.5° to 15°, more preferably of from 0.5° to 10°, yet more preferably of from 0.5° to 7.5°, and most preferably of from 0.5° to 5°, e.g. 1° or 3.5°. The skirt angle opens downwards towards the bottom of the direct drive drum. The portion of a support element extending over the skirt section may be called the skirt portion of the support element. Hence the skirt angle is also the angle between the belt support surface of the skirt portion of a support element and the drum rotation axis. The skirt angle may remain constant or change over the skirt section or the skirt portion of a support element.

An advantage of having the skirt section is a smoother way by which
  the direct drive drum engages the incoming modular conveyor belt, and
  the modular conveyor belt is bent while being forced from a linear motion (a straight alignment) into a circular motion (a circular alignment) around the direct drive drum.

Owing to the skirt angle the diameter of the direct drive drum increases over the skirt section towards its bottom (which is why the skirt section can also be called "conical section"), where the incoming (portion of the) modular conveyor belt is fed to and approaches the direct drive drum. As the modular conveyor belt is forced from an essentially straight direction of movement into a curvilinear or even circular direction of movement, i.e. into a bend (around the direct drive drum), bending in a lateral direction (transversely or perpendicular to the direction of belt travel) and towards the direct drive drum occurs. This requires adjacent belt modules to turn or twist relative to each other at least to some degree in said lateral direction: For example, adjacent belt modules can be connected by intercalating link ends, whereby the intercalating link ends are linked by a pivot rod extending through slots in the link ends, the slots allowing the pivot rod to move to some extent in the direction of belt travel and in the opposite direction thereby forming a somewhat flexible connection. Alternative flexible connections of adjacent belt modules, for example by clipping, are also possible. The flexible connection allows the individual belt modules to somewhat move relative to each other and thereby allows the modular conveyor belt or a section thereof to undergo bending in order to cling to the direct drive drum as close as possible. The larger diameter of the direct drive drum within the skirt section leads to a larger circumference of the direct drive drum so that the initial amount of bending of the modular conveyor belt in the skirt section at and near the bottom of the direct drive drum is reduced compared to the bending of the modular conveyor belt further up on the direct drive drum, particularly if compared to the amount of bending in the direct drive section. A reduced amount of bending is accompanied by a reduced amount of change of orientation of the individual modules of the modular conveyor belt relative to each other, hence a reduced amount of tension within the modular conveyor belt, between the individual modules of the modular conveyor belt and between the modular conveyor belt and the direct drive drum. The reduction of tension on the outermost modules is caused by the diameter change when the belt is moving upwards along the skirt section. Since the rows of modules are set after engagement with the drive elements the tension on the outermost links is released because they move towards a smaller diameter or in other words come closer to each other.

A direct drive element may extend into the skirt section. This arrangement offers the benefit of (gradually or slowly) changing, according to the skirt angle, the amount of protrusion or the protrusion height of a direct drive element beyond an adjacent support element, in particular increasing the protrusion height of a direct drive element beyond an adjacent support element with an increasing distance from the lower support end and/or from the bottom of the direct drive drum and/or in a direction towards the skirt section top end. Changing the amount of protrusion or the protrusion height of a direct drive element beyond an adjacent support element, especially if performed gradually or slowly, has the advantage of causing a delay until the direct drive element and thus the direct drive drum fully engages the modular conveyor belt, thereby enabling free movement of the modules of the modular conveyor belt relative to each other, i.e. the modules can be re-orientated from their linear alignment into a circular alignment as need be and with a reduced amount or no built up of tension within the modular conveyor belt, between the individual modules of the modular conveyor belt and between the modular conveyor belt and the direct drive drum.

Preferably a direct drive element protrudes, in particular with a protrusion height, beyond the belt support surface of an adjacent support element.

The direct drive drum according to the invention may comprise a collapse section, in which no direct drive element protrudes in a radial direction away from the drum rotation axis beyond an adjacent support element, and an adjacent engagement section, in which a protrusion of at least one of the direct drive elements in a radial direction away from the drum rotation axis extends beyond an adjacent support element. The collapse section may be extending from a bottom part, a bottom section or bottom end of the direct drive drum or from a top part, a top section or top end of the direct drive drum. The collapse section and the engagement section may form part of the skirt section or may form the skirt section, in which case the collapse section extends from the lower support end of the skirt section.

The protrusion of a direct drive element in a radial direction away from the drum rotation axis beyond an adjacent support element has a protrusion height which advantageously increases in a direction away from the collapse section at least in a portion of the engagement section. This arrangement of a collapse section and an adjacent engagement section offers the benefit of (gradually or slowly) increasing the protrusion height of a direct drive element beyond an adjacent support element with an increasing distance from the collapse section of the direct drive drum. Within the collapse section the modular conveyor belt initially contacts the direct drive drum and the re-orientation of the modules of the modular conveyor belt begins, i.e. the modular conveyor belt is fed to the direct drive drum (therefore the collapse section can also be called "infeed section"). Accordingly, no protrusion of a direct drive element drum in the collapse section, and
increasing the amount of protrusion or the protrusion height of a direct drive element beyond an adjacent support element, especially if performed gradually or slowly, in the adjacent engagement section of the direct drive drum have the advantage of causing a delay until the direct drive element and thus the direct drive drum fully engages the modular conveyor belt, thereby enabling free movement of the modules of the modular conveyor belt relative to each other. In this way the belt modules can be re-orientated from their linear alignment into a circular alignment as need be and with a reduced amount or no built up of tension within the modular conveyor belt, between the individual modules of the modular conveyor belt and between the modular conveyor belt and the direct drive drum.

At least in a portion of the engagement section of the direct drive drum according to the invention the protrusion height of a direct drive element may decrease in a direction away from the collapse section. A decrease of the protrusion height (beyond the belt support surface of an adjacent support element), especially to a level at which there is no protrusion (beyond the belt support surface of an adjacent support element), has the advantage of reducing in circumferential direction of the direct drive drum the number of drive elements (fully) engaging the modular conveyor belt, thereby allowing more movement of the modules of the modular conveyor belt relative to each other and thus better re-orientation and/or less tension within the modular conveyor belt.

In the engagement section the protrusion height of a direct drive element may
only increase in a direction away from the collapse section;
only decrease in a direction away from the collapse section;

first increase and then decrease in a direction away from the collapse section;

first decrease and then increase in a direction away from the collapse section;

increase and decrease in a direction away from the collapse section; or increase at least once and decrease at least once in a direction away from the collapse section.

The direct drive drum according to the invention may comprise a direct drive section adjacent to the engagement section, in which the protrusion height of at least one of the direct drive elements in a radial direction away from the drum rotation axis beyond an adjacent support element has a protrusion height which is constant. The role of the direct drive section with its direct drive elements is to fully engage and thereby drive the modular conveyor belt, an advantage being that the modular conveyor belt is reliably driven by a section of the direct drive drum which is specifically dedicated to the task of driving and supporting the modular conveyor belt. Preferably the direct drive elements protrude with a constant protrusion height within the direct drive section so that the modular conveyor belt is fully and evenly engaged by the direct drive elements of the direct drive section, advantageously allowing for a substantially even and uniform transmission of force from the direct drive drum to the modular conveyor belt.

Preferably the direct drive section is positioned adjacent to and directly above the engagement section.

The direct drive drum according to the invention may comprise a disengagement section, in which no direct drive element protrudes in a radial direction away from the drum rotation axis beyond an adjacent support element. In other words, the direct drive drum according to the invention may comprise a disengagement section, in which the belt support surface of each support element protrudes beyond an adjacent direct drive element or its drive rib, or is on a level with an adjacent direct drive element or its drive rib, particularly on a level with the—in a radial direction away from the drum rotation axis—outermost edge of the drive rib of an adjacent direct drive element, i.e. of an adjacent drive rib.

Due to this arrangement, the direct drive elements within the disengagement section do not engage the modular conveyor belt. The role of the disengagement section is to prepare the modular conveyor belt for its release from the direct drive drum and to eventually release the modular conveyor belt therefrom. Accordingly, no protrusion of a direct drive element in the disengagement section leads to no direct drive element engaging the modular conveyor belt in the disengagement section, i.e. the direct drive elements do not transmit force (by pushing against individual modules of the modular conveyor belt) to the modular conveyor belt. In other words, in the disengagement section each module of the modular conveyor belt is supported by the direct drive drum, but not engaged by a direct drive element. This advantageously facilitates the release of the modular conveyor belt from the direct drive drum and re-alignment of its modules from a circular to a linear alignment.

Thus, during the disengagement phase forces transmitted from the direct drive drum onto the conveyor belt can advantageously be reduced and the re-alignment of belt modules be facilitated by this reduction of the number of direct drive elements and drive ribs engaging the modular conveyor belt, which also reduces the adherence of the modular conveyor belt to the direct drive drum and hence facilitates its release therefrom.

The direct drive drum according to the invention can comprise an upper skirt section. The direct drive drum can comprise an upper skirt section without or in addition to a lower skirt section. The direct drive drum can comprise a lower skirt section without or in addition to a lower skirt section.

In the upper skirt section the belt support surfaces of the support elements are angled at an angle (skirt angle or slope angle) with respect to the drum rotation axis. The skirt angle opens upwards towards the top of the direct drive drum. The skirt angle or slope angle may be of from 0.5° to 30°, preferably of from 0.5° to 15°, more preferably of from 0.5° to 10°, yet more preferably of from 0.5° to 7.5°, and most preferably of from 0.5° to 5°, e.g. 1° or 3.5°, with respect to the drum rotation axis.

The upper skirt section, which may comprise a collapse and/or an engagement section, can help with the engagement of a modular conveyor belt being fed to the direct drive drum on the top side and running downwards.

Alternatively, with a modular conveyor belt running upwards, the upper skirt section, which may comprise a disengagement section, can help with the disengagement of the modular conveyor belt leaving or unwinding from the direct drive drum on the top side.

In one aspect of the invention the upper skirt section comprises a collapse and/or engagement section and helps with the engagement of the modular conveyor belt being fed to the upper part of the direct drive drum, particularly fed to the upper skirt section thereof, and the lower skirt section, which may comprise a disengagement section, helps with the disengagement of the modular conveyor belt leaving or unwinding from the lower part of the direct drive drum, particularly leaving or unwinding from the lower skirt section thereof.

Conversely, in another aspect of the invention the upper skirt section, which may comprise a disengagement section, helps with the disengagement of the modular conveyor belt leaving or unwinding from the upper part of the direct drive drum, particularly leaving or unwinding from the upper skirt section thereof, and the lower skirt section comprises a collapse and/or engagement section and helps with the engagement of the modular conveyor belt being fed to the lower part of the direct drive drum, particularly being fed to the lower skirt section thereof.

In case the skirt section is a second skirt section and used to help with the disengagement of the modular conveyor belt, the second skirt section can comprise a disengagement section. In this case the effect on helping with the disengagement is provided by both the disengagement section, in which no direct drive element protrudes in a radial direction away from the drum rotation axis beyond an adjacent support element, and by the skirt angle, i.e. by the angling of the belt support surfaces of the support elements as follows. When the modular conveyor belt, on leaving or unwinding from the direct drive drum, changes from a circular to a linear direction of belt travel, the individual belt modules need to re-align and come off the outer surface, in particular off the direct drive elements of the direct drive drum, and off the support elements and belt support surfaces thereof. Both the re-alignment of the belt modules and the release from the outer surface of the direct drive drum is accompanied by the build-up of tension between the direct drive drum and the modular conveyor belt and within the modular conveyor belt.

The process of re-alignment of the belt modules from an angular or bent orientation into a straight orientation relative to each other can be improved and rendered more smoothly by continuously increasing the diameter of the direct drive drum in the skirt section and towards the outlet section where the modular conveyor belt unwinds from and leaves the direct drive drum.

Also for this process of re-alignment and the process of release from the outer surface of the direct drive drum it helps to reduce the amount of force transmitted from the direct drive drum onto the modular conveyor belt. This can advantageously be accomplished by continuously moving the modular conveyor belt away from the direct drive elements, particularly their drive ribs through the design of the drive elements, i.e. by a disengagement section, and/or the angled belt support surfaces in the skirt section. This way particularly the protrusion height of the drive ribs over the adjacent belt support surfaces can be reduced. At the same time the size of the contact surface between the drive ribs and the modular conveyor belt is continuously reduced and hence their adherence thereto.

The continuous character of this process avoids any jerky movements of the modular conveyor belt, which could otherwise be caused by a sudden change of forces transmitted to the modular conveyor belt, e.g. during the unwinding from the direct drive drum. Jerky movements of the modular conveyor belt can
- damage it or reduce its lifetime by causing increased or even excessive mechanical stress on its parts, and/or
- can cause damage to and/or spillage of any items and/or liquids transported by the modular conveyor belt.

The direct drive drum according to the invention can comprise one or more, e.g. one, two, three or four guide rails or one or more guide frames, e.g. one, two, three or four guide frames, each of which one or more guide rails may form part of.

The modular conveyor belt of the present invention may run on one or more guide rails, preferably two guide rails. The guide rails wind around the direct drive drum in a spiral and may form part of a guide frame. The guide rails and the guide frame, if present, act as a support for the modular conveyor belt, supporting the same (from below) against the force of gravity and optionally also laterally. The guide rails and the guide frame, if present, thereby guide the modular conveyor belt around the direct drive drum and upwards or downwards of it. The guide rails and the guide frame, if present, may be fixed (e.g. by rods or sprockets) to the (cage structure of the) direct drive drum and hence turn with the direct drive drum, or, alternatively, be fixed to a cage or scaffold forming a stationary guide frame which does not turn with the direct drive drum.

In case of guide rails being used, there may be an outer guide rail and an inner guide rail, the outer guide rail being located further away from the drum rotation axis than the inner guide rail. Between the outer guide rail and the inner guide rail there can be one or more further guide rails.

The guide rails and/or the support surface independently from each other can have a particular cross-sectional profile selected from the group consisting of a rail in the form of a (classic) rail having a smooth running surface, a flat metal strip and an L profile.

There can be guide slots in the aforementioned profiles of the guide rails and/or support surface and/or in (the belt modules of) the modular conveyor belt, with the guide slots in the guide rails and support surface receiving prongs or edges protruding from the belt modules of the modular conveyor belt, while the guide slots in (the belt modules of) the modular conveyor belt receive the guide rails; said guide slots may provide (additional) lateral guidance to the modular conveyor belt.

The L profile may provide lateral guidance by itself (by acting) on the outer parts of the modular conveyor belt pointing away from the direct drive drum or its (circumferential) belt support surface(s), but for additional lateral guidance the L profile can feature guide slots, too.

The present invention also provides a conveyor system comprising a direct drive drum as described herein and a modular conveyor belt as described herein.

Within the conveyor system according to the invention preferably
 (i) each support element is as described herein and has a belt support surface on a side distant and pointing away from the drum rotation axis, at least some of the belt support surfaces supporting the modular conveyor belt; and/or
 (ii) at least some of the direct drive elements are as described herein and engage the modular conveyor belt in an engagement section and/or a direct drive section of the direct drive drum.

The conveyor system is preferably a spiral conveyor system, in which the modular conveyor belt describes a spiral or helix while travelling up and around the direct drive drum. In other words, the line along which the modular conveyor belt travels up and around the direct drive drum describes or resembles a spiral or helix.

A further aspect of the invention is a method of manufacturing a direct drive drum for a modular conveyor belt by removing some support elements from a drum comprising a plurality of support elements and replacing each of the removed support elements by a direct drive element. In this way already existing drums may be retrofitted to direct drive drums according to the invention.

For a further understanding of the nature and objects of the invention, reference is made to the following detailed description of various embodiments of the invention in conjunction with the accompanying drawings and figures (hereinafter referred to as "Figures" ("Figs.") or in the singular as "Figure" ("Fig.")). Throughout the Figures similar features (mechanical element or part, geometric term such as a direction, section, surface, height, angle, midpoint etc.) are designated by similar reference signs, whereby reference signs used for the similar features of different embodiments differ by one hundred, two hundred or several hundred between the embodiments; for instance, the direct drive drum is designated by the reference signs 100, 500, 600, 800, 900, 1000, 1100, 1200, 1300, 1400, 1500, 1600, 1700, 1800, 1900, 2000, 2100, 2200, 4500, 4600, 4700, 4800 and 4900 the support element is designated by the reference signs 110, 510, 610, 710, 810, 910, 1010, 1110, 4510 and 4910, the direct drive element is designated by the reference signs 120, 520, 620, 720, 820, 920, 1020, 1120, 1220, 1320, 1420, 1520, 1620, 1720, 1820, 1920, 2020, 2120, 2220, 4520, 4620, 4720, 4820 and 4920 or the collapse section is designated by the reference signs 153, 553, 653, 753, 853 and 953 in the various embodiments. Therefore and for the sake of conciseness, recurring features in the Figures are not necessarily denoted in the description for every single Figure. They can be identified by comparing the last two ciphers of the reference sign in the Figure with the last two ciphers of the reference sign of the first embodiment shown in FIGS. 1 to 10 and fully denoted in the description, or alternatively of another embodiment.

It is to be understood that the various embodiments described herein generally and specifically (with respect to one or more Figures) and depicted in the Figures are mutually compatible in line with the technical teaching provided herein and can thus be combined, and one or more features of one particular embodiment and/or Figure can be used within another embodiment generally or specifically described or depicted in a Figure herein.

FIG. 8 illustrates the situation in which the direct drive elements of the direct drive drum do not engage the modular conveyor belt, e.g. when a direct drive element does not protrude beyond an adjacent support element such as in the collapse section or disengagement section of the direct drive drum;

FIG. 9 illustrates the situation in which the direct drive elements of the direct drive drum partially engage the modular conveyor belt, e.g. when the protrusion height of a direct drive element beyond an adjacent support element changes (increases or decreases) such as in the engagement section of the direct drive drum;

FIG. 10 illustrates the situation in which the direct drive elements of the direct drive drum fully engage the modular conveyor belt, e.g. at the skirt section top end or in the direct drive section of the direct drive drum, where a direct drive element fully protrudes beyond an adjacent support element.

Figure 15:
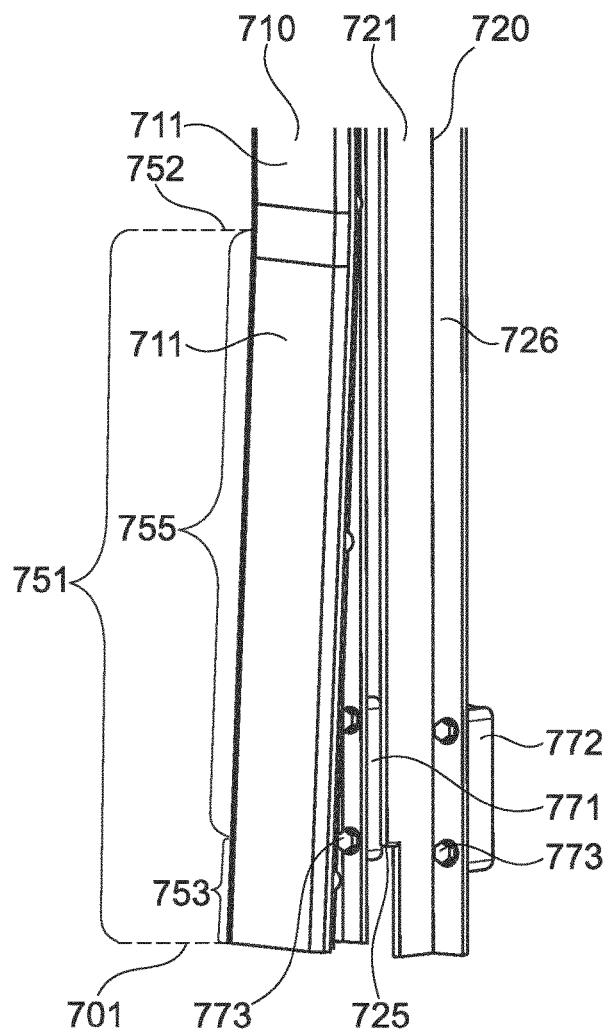
Figure 16:
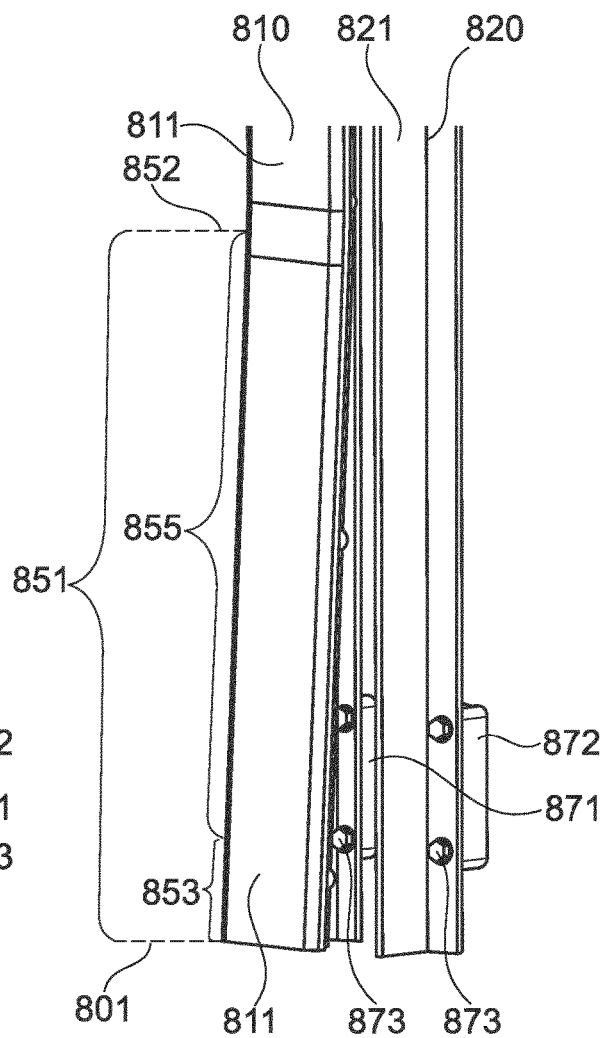
Figure 17:
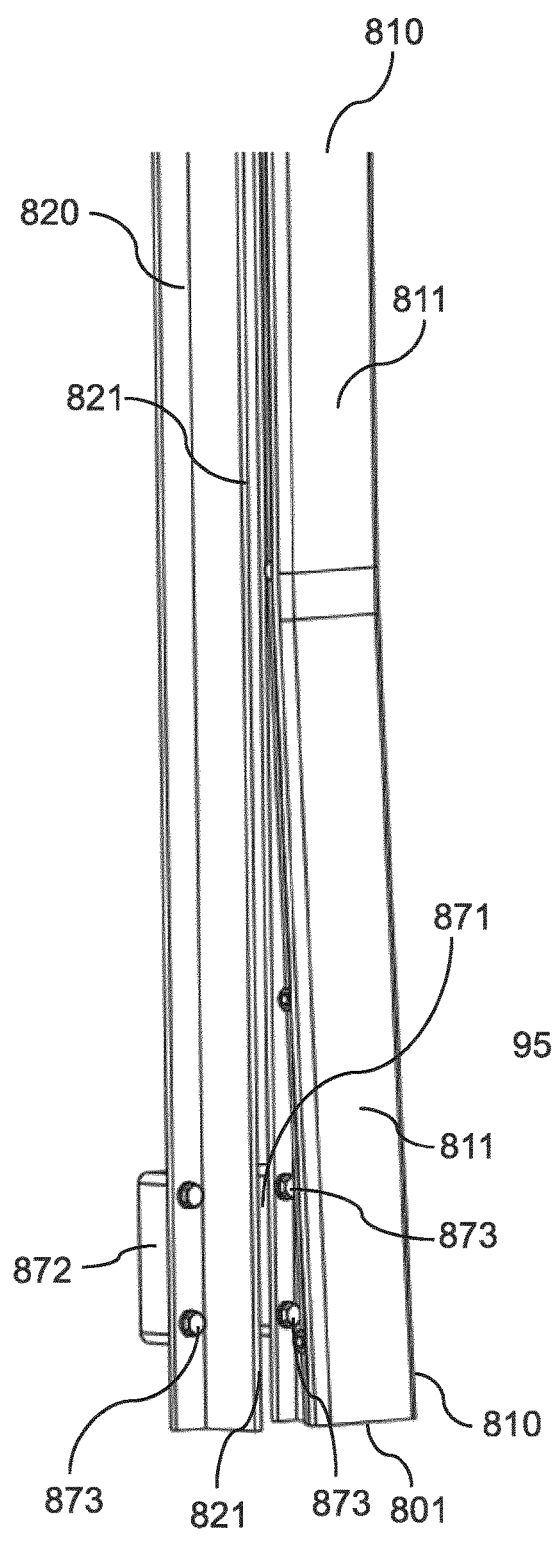

FIGS. 15, 16, 17 and 19 each are a perspective view of a lower section of a support element and of a direct drive element according to further embodiments of the invention, whereby FIG. 17 illustrates the same embodiment as FIG. 16, but shows a larger section of the elements from another side.

Figure 19:
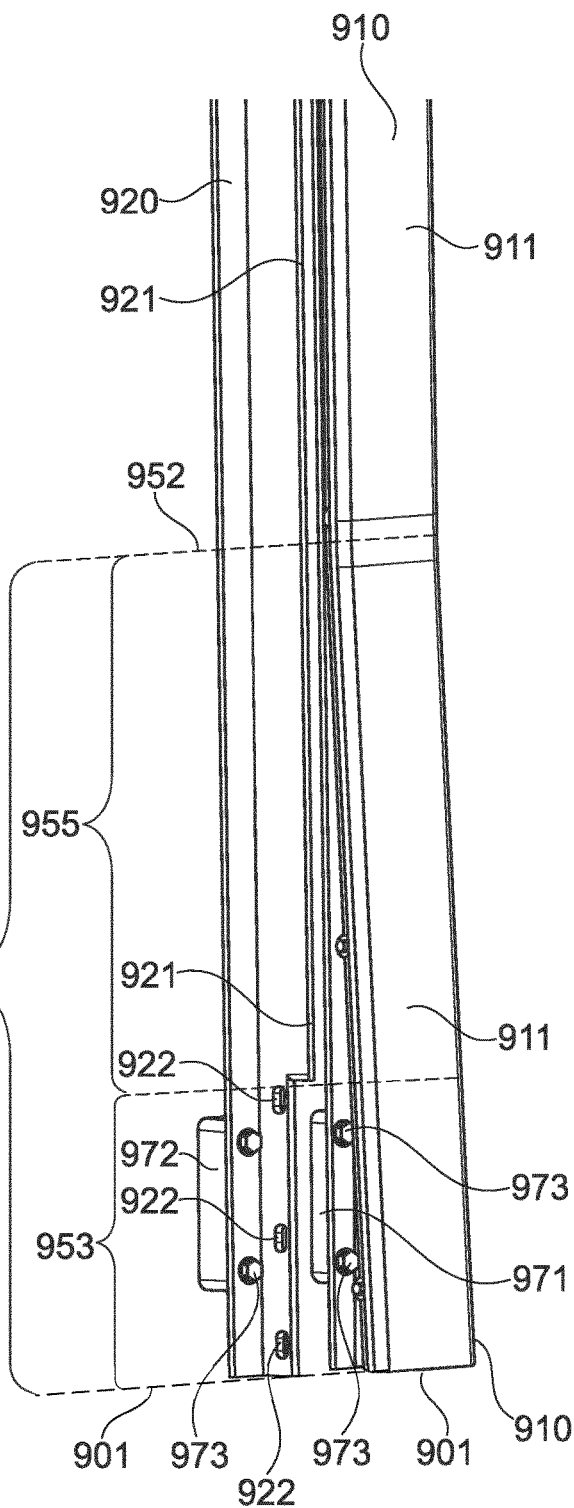
Figure 18:
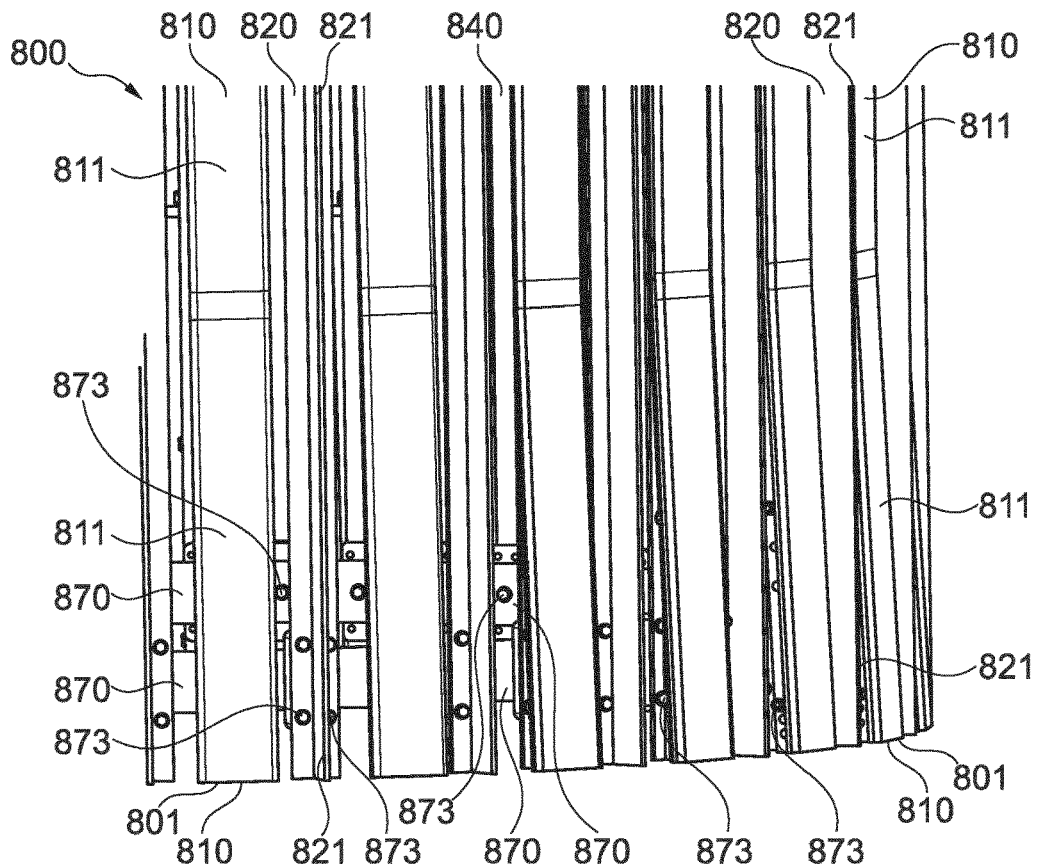
Figure 20:
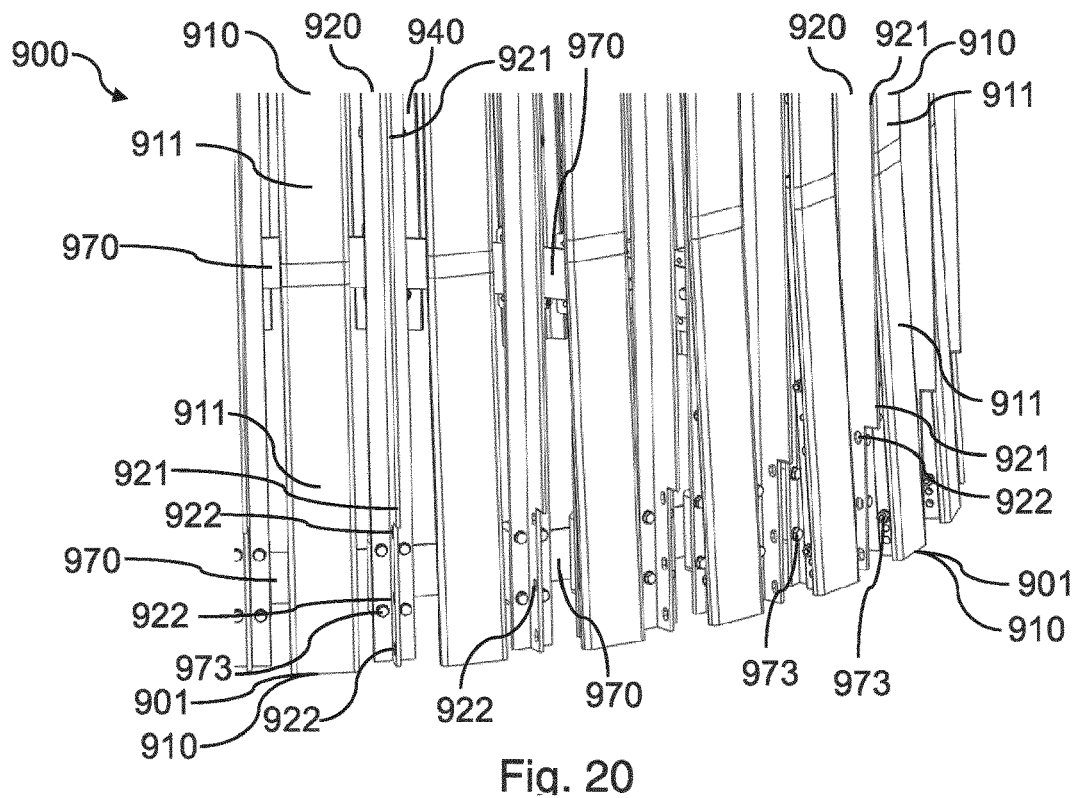
Figure 21:
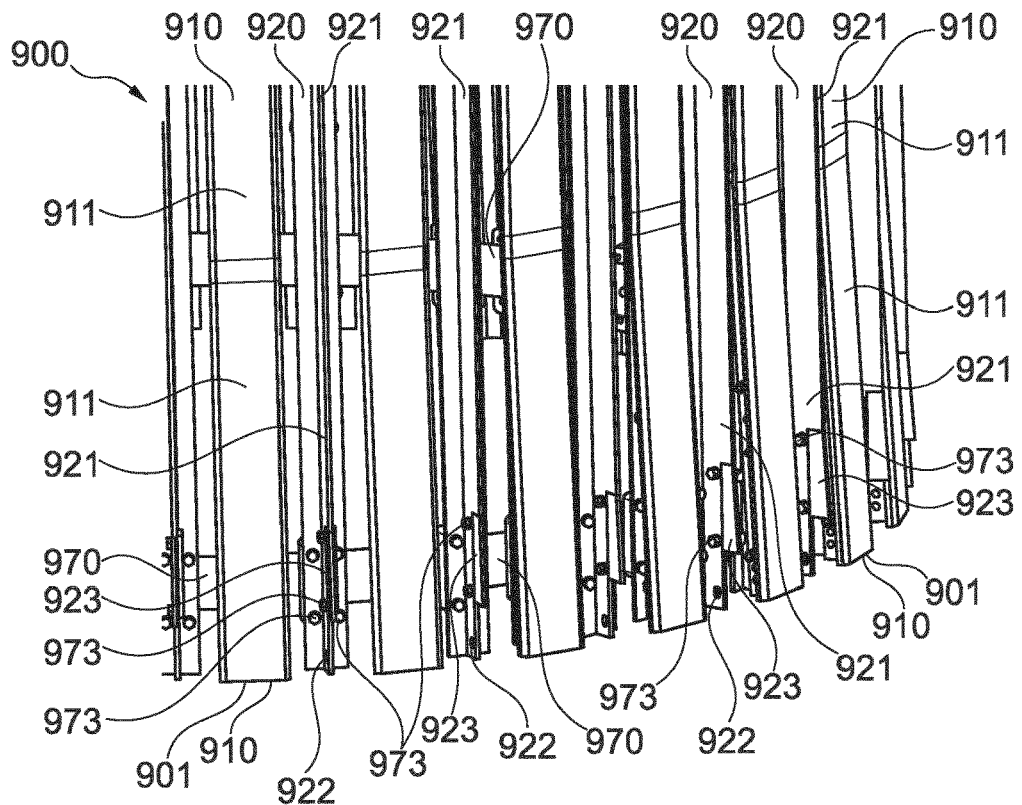
Figure 22:
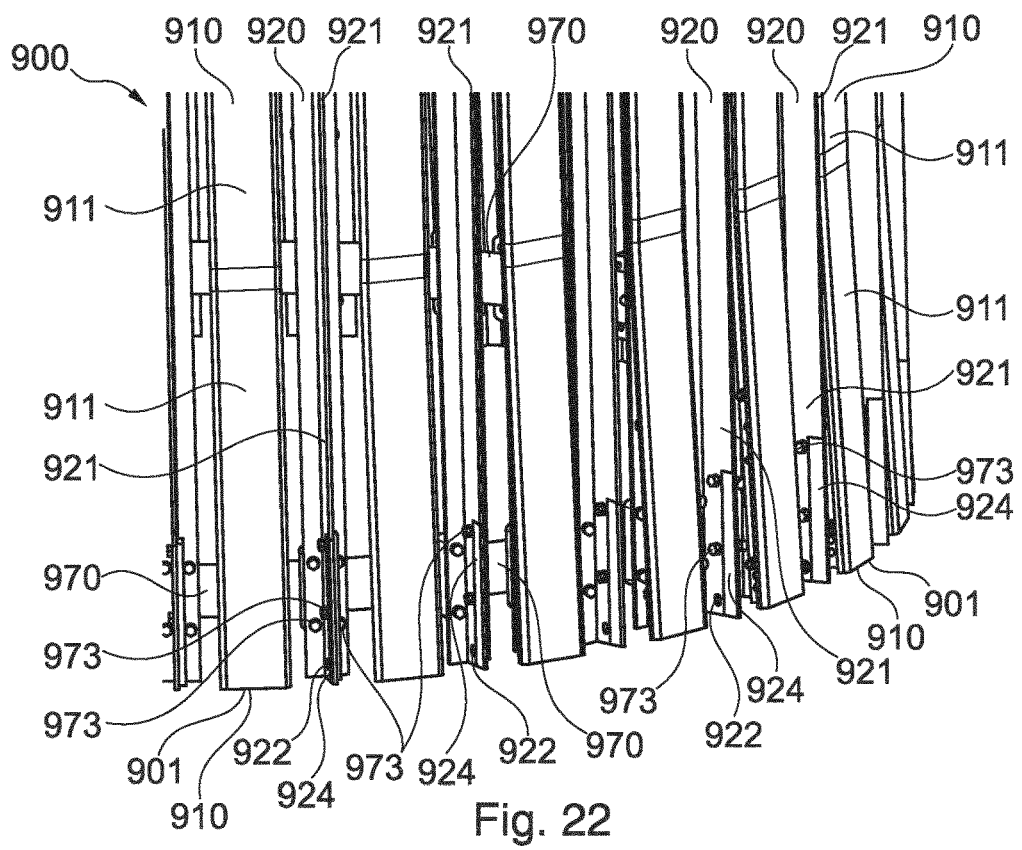

FIGS. 18, 20, 21 and 22 each are a perspective view of a lower section of the direct drive drum according to further embodiments of the invention, whereby FIG. 18 illustrates the same embodiment as FIGS. 16 and 17, FIG. 20 illustrates the same embodiment as FIG. 19, and FIGS. 21 and 22 illustrate embodiments closely related to the embodiments shown in FIGS. 19 and 20, the only difference being different drive rib extension pieces of the direct drive elements in FIGS. 21 and 22.

FIGS. 23 to 35 each are a perspective view of a lower section of the direct drive drum near and including the lower support end according to further embodiments, whereby the design of the lower section of the drive rib of each direct drive element changes from one FIG. to another.

FIGS. 36 to 47 each show a different cross sectional profile of the drive rib of a direct drive element according to embodiments of the invention, whereby each cross sectional profile is seen from the top or bottom end of a direct drive element mounted on the direct drive drum, and the open top end (without a line drawn) faces towards the drum rotation axis, whereas the (blunt, rounded, curved or pointed) bottom end points in a radial direction away from the drum rotation axis or at an angle to that direction in order to engage a modular conveyor belt.

FIG. 48 is a perspective view of an upper section of the direct drive drum as shown in FIGS. 1 to 3 and 5.

FIGS. 49 to 52 each are a perspective view of an upper section of the direct drive drum near and including the upper support end according to further embodiments of the invention, whereby the design of the upper section of the drive rib of each direct drive element changes from one FIG. to another.

Figure 53:
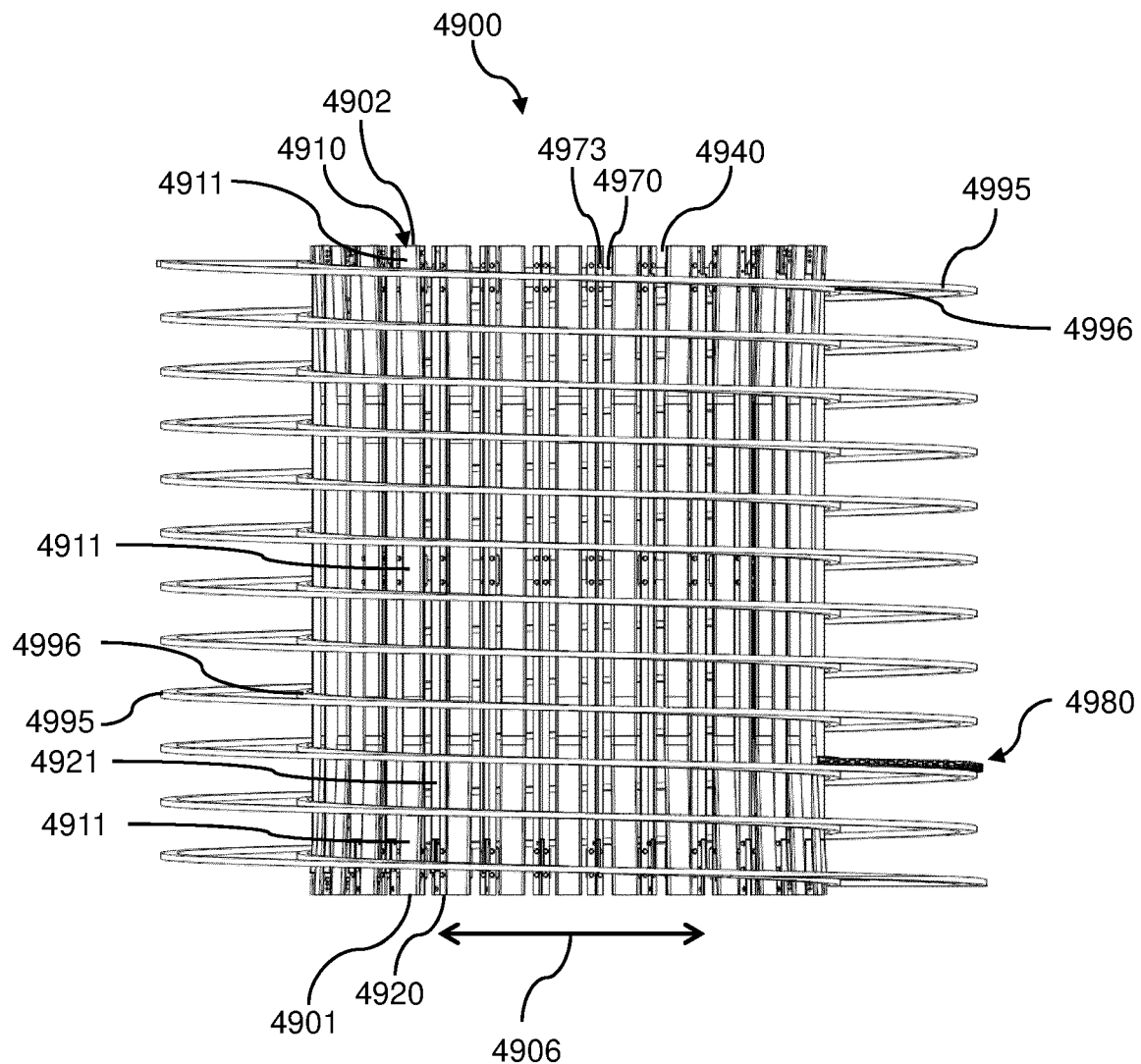

FIG. 53 is a side view of a spiral conveyor system comprising a lower skirt section and an upper skirt section and guide rails.

Figure 54:
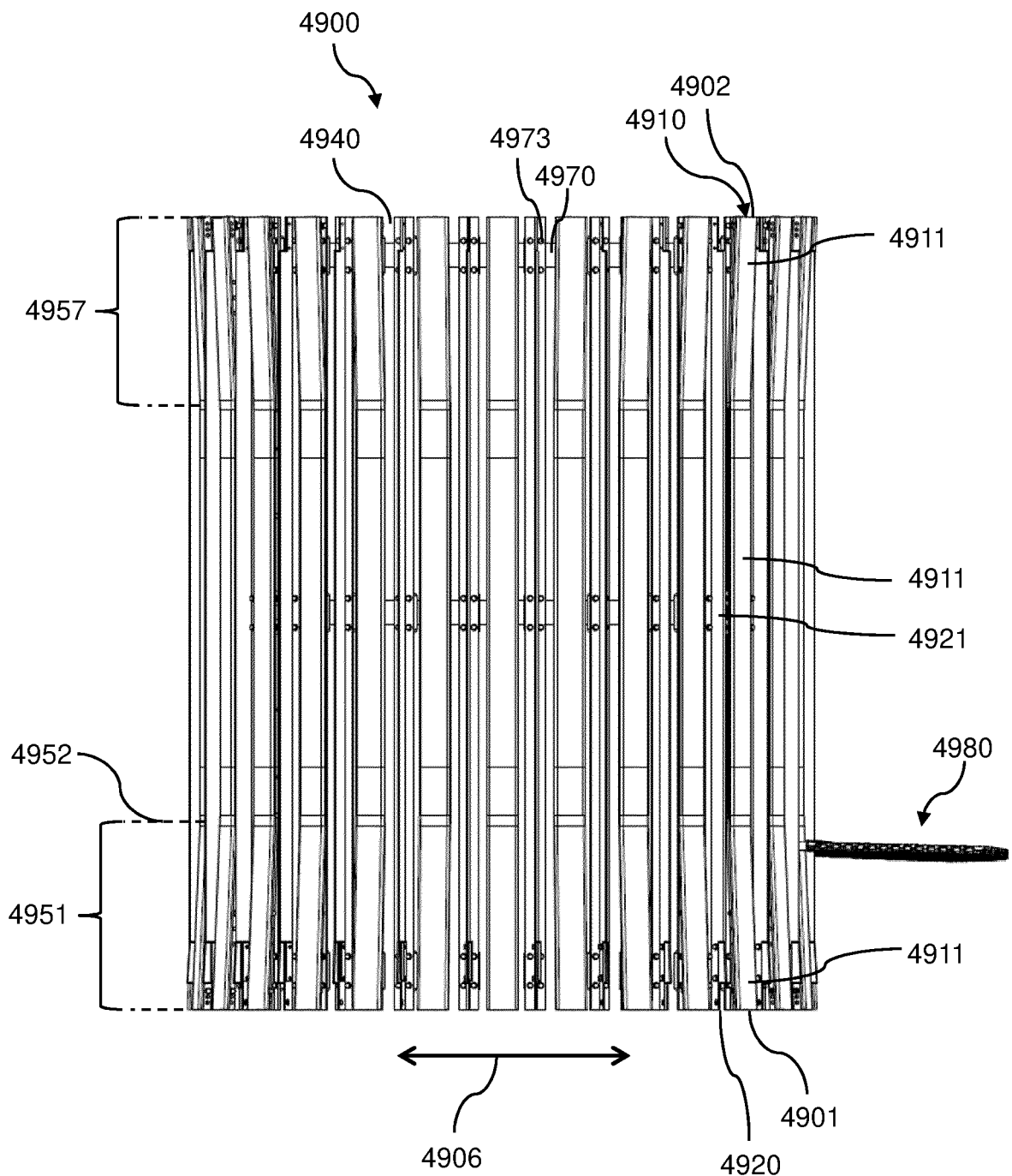

FIG. 54 is a side view of the spiral conveyor system of FIG. 53 without the guide rails.

Figure 1:
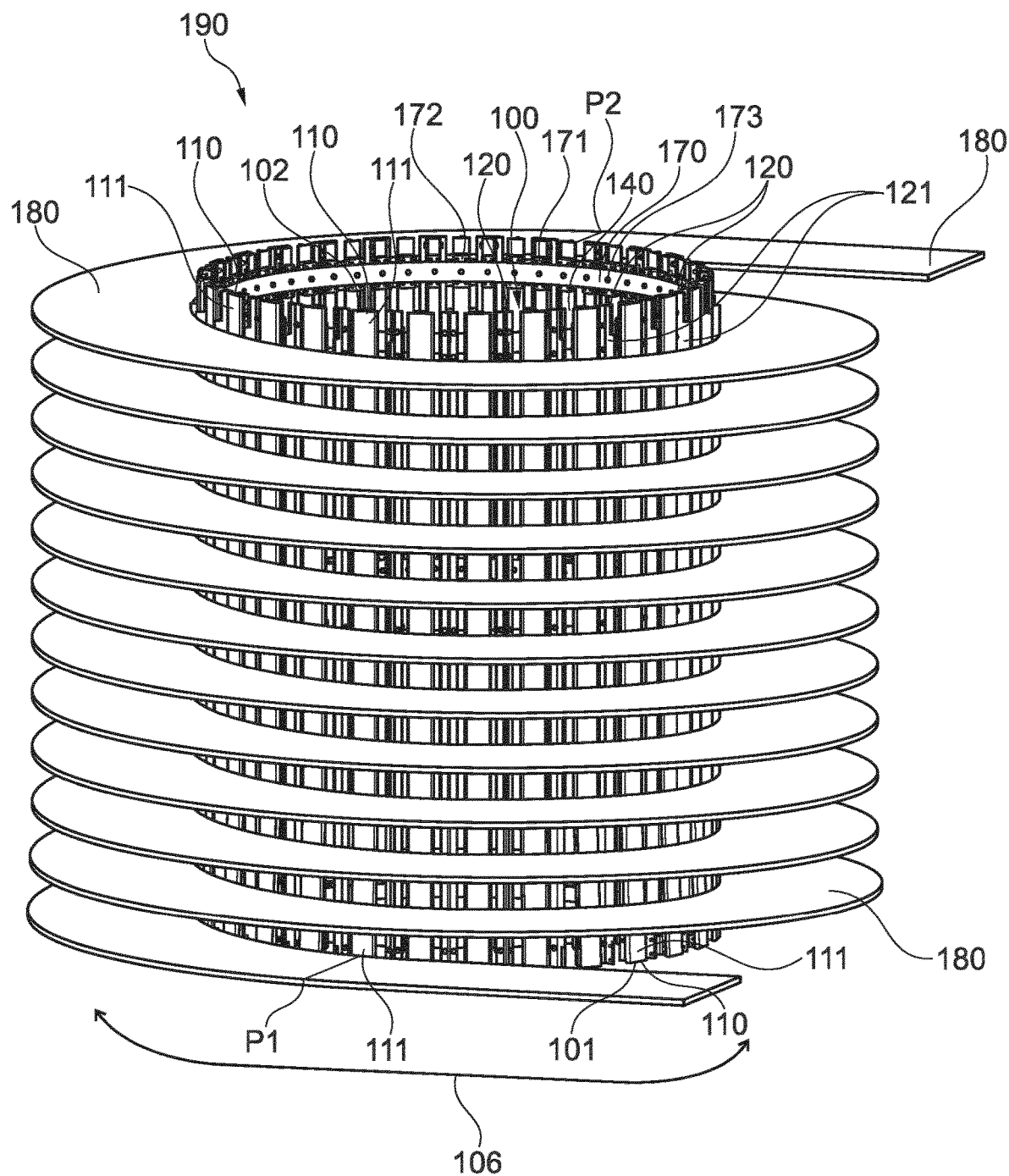
FIG. 1 is a perspective view of a spiral conveyor system comprising a direct drive drum and a (schematically represented) modular conveyor belt according to one embodiment of the invention.
Figure 2:
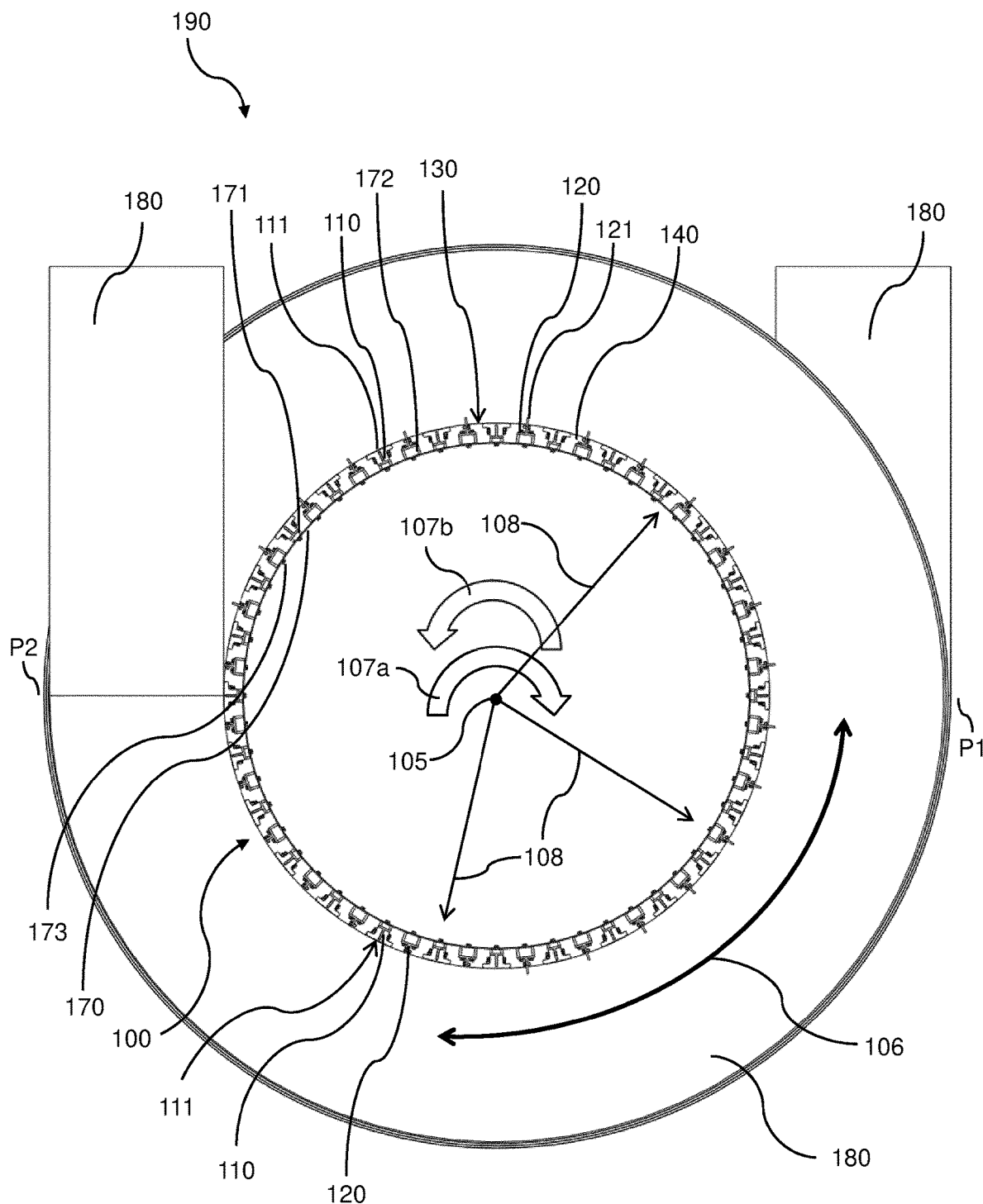
FIG. 2 is a top view of the spiral conveyor system of FIG. 1.
Figure 5:
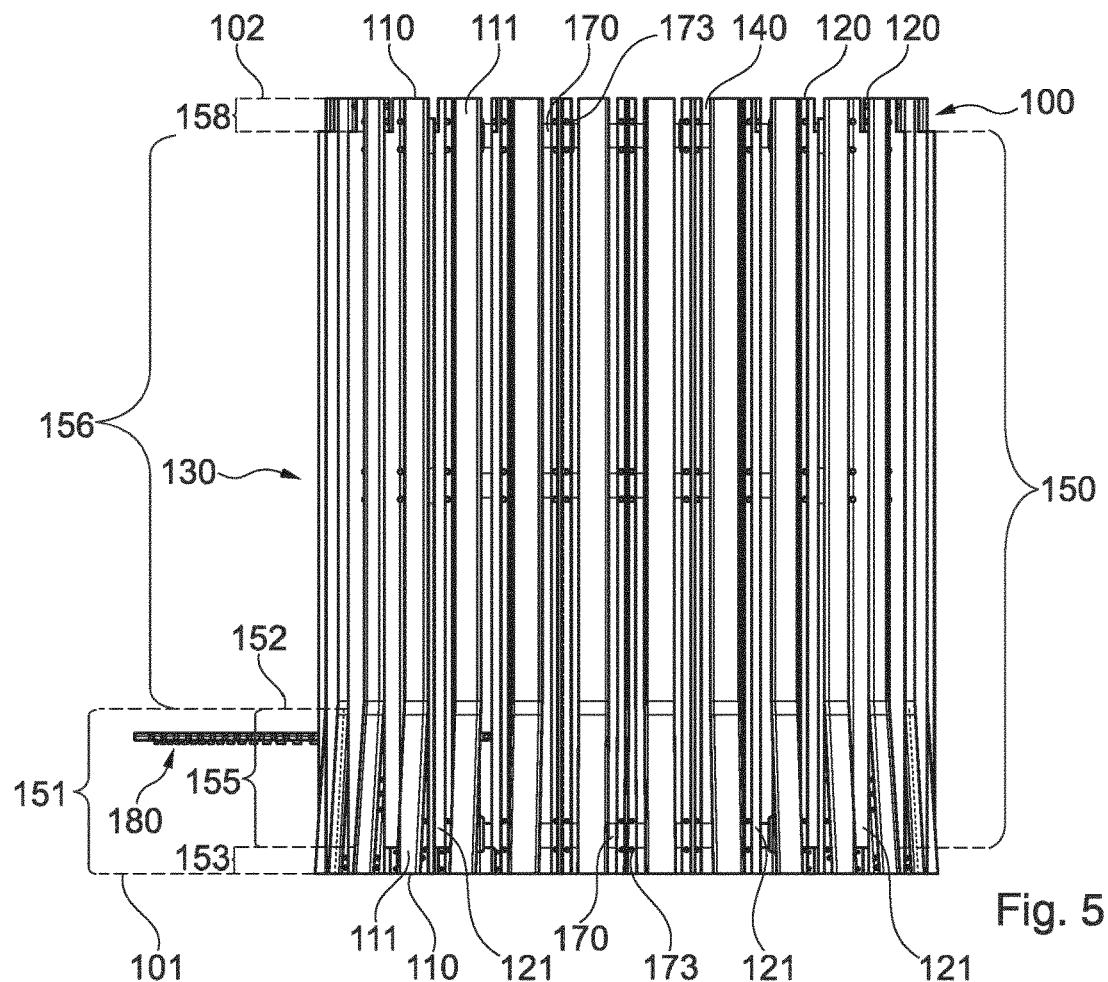
FIG. 5 is a side view of the direct drive drum of FIG. 3 together with a section of a modular conveyor belt.
Figure 6:
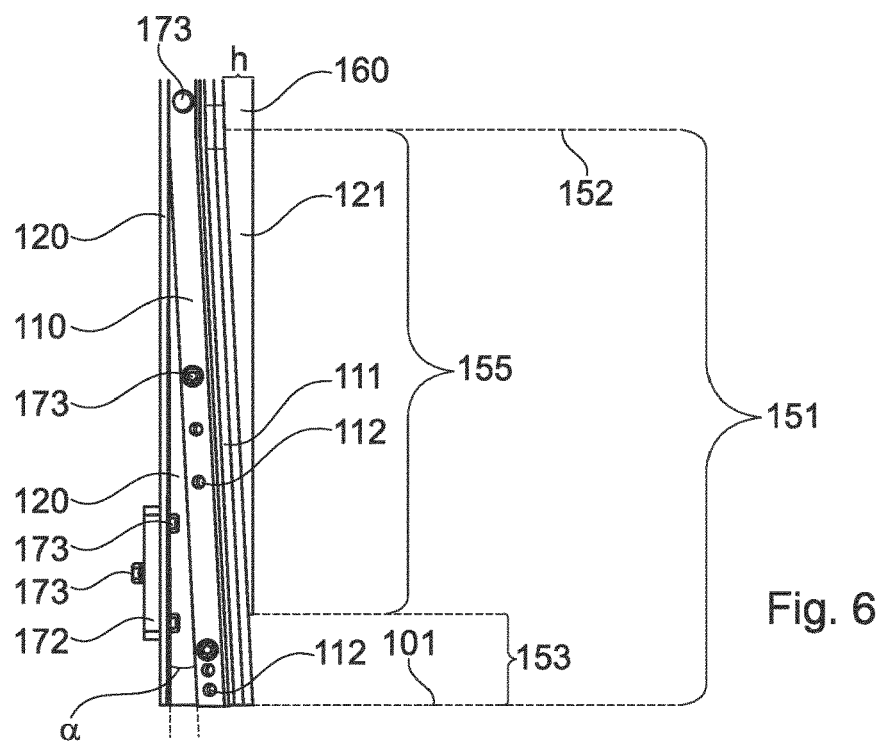
FIG. 6 is a side perspective view of a lower section of a support element and of a direct drive element, each mounted to the cage of the direct drive drum of FIGS. 1 to 5.
Figure 7:
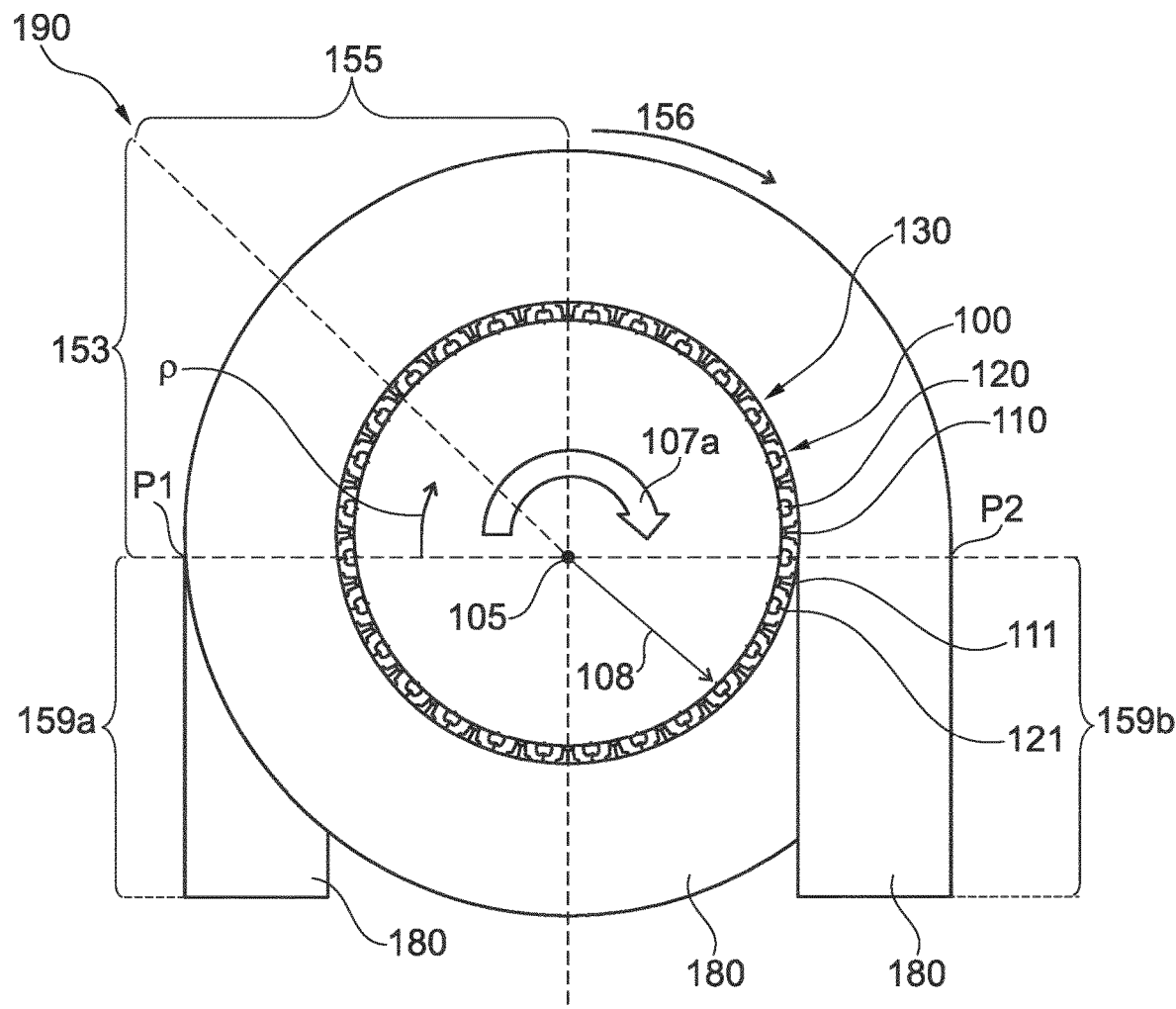
FIG. 7 is a partially schematic top view of the spiral conveyor system depicted in FIGS. 1 and 2.

Referring to FIGS. 1 to 7, a conveyor system 190 according to a first embodiment of the invention comprises a direct drive drum 100 as described in more detail further below and which rotates in a clockwise direction 107*a* or anti-clockwise direction 107*b* (seen from above) around a drum rotation axis 105 as shown in FIGS. 2 and 7, thereby supporting and driving a modular conveyor belt 180. The modular conveyor belt 180 describes a spiral or helix, while travelling up and around the direct drive drum 100 or travelling down and around the direct drive drum 100: The modular conveyor belt 180 is fed to the direct drive drum 100 at the belt infeed section and leaves the direct drive drum 100 at the belt outlet section.

In one variant of the first embodiment of the invention the belt infeed section is located before (in the direction of belt travel) the engagement section and at or near the bottom of the direct drive drum 100, e.g. at or near point P1, while the belt outlet section is located behind (in the direction of belt travel) the disengagement section and at or near the top of the direct drive drum 100, e.g. at or near point P2; in this variant the modular conveyor belt 180 travels up and around the direct drive drum 100 in a clockwise direction 107*a*, thereby describing a spiral or helix.

In another variant of the first embodiment of the invention the belt infeed section is located before (in the direction of belt travel) the engagement section and at or near the top of the direct drive drum 100, e.g. at or near point P2, while the belt outlet section is located behind (in the direction of belt travel) the disengagement section and at or near the bottom of the direct drive drum 100, e.g. at or near point P1; in this variant the modular conveyor belt 180 travels down and around the direct drive drum 100 in an anti-clockwise direction 107*b*, thereby describing a spiral or helix.

No matter which variant of the first embodiment, such a conveyor system 190 is also called a spiral conveyor system 190.

The direct drive drum 100 comprises a plurality of support elements 110 and a plurality of direct drive elements 120 arranged in circumferential direction 106 of the direct drive drum 100 separate and in a distance (caused by gaps 140) from each other, hence forming a cylindrical or quasi-cylindrical periphery of the direct drive drum 100. Each support element 110 extends from a lower support end 101 to an upper support end 102 and has a belt support surface 111 on a side distant and pointing away from the drum rotation axis 105. The belt support surfaces 111 support the modular conveyor belt 180. Each direct drive element 120 comprises a drive rib 121 and engages therewith the modular conveyor belt 180 in an engagement section 155 and a direct drive section 156 of the direct drive drum 100, see in particular FIG. 5.

The lower support end 101 can be level with or near the bottom of the direct drive drum. For instance, the lower support end 101 may be near the bottom of the direct drive drum 100 if said bottom is formed by a turntable or other turning base or disk on which the lower section of each support element 110 (with its lower support end 101) and each direct drive element 120 is mounted. The turntable or other turning base or disk may be used to attach the direct drive drum 100 to a bearing and/or drive the direct drive drum 100 by a motor. Similarly, the upper support end 102 may be near the top of the direct drive drum 100 if said top is formed by a turning top or disk on which the upper section of each support element 110 (with its upper support end 102) and each direct drive element 120 is mounted. The turning top or disk may be used to attach the direct drive drum 100 to a bearing and/or drive the direct drive drum 100 by a motor.

Each support element 110 extends (with its longitudinal axis) in the upper part of the direct drive drum 100 parallel to the drum rotation axis 105 and parallel to each direct drive element 120. In the lower part, which has the shape of a skirt and is therefore designated as skirt section 151, see in particular FIGS. 3 to 6, each support element extends at an angle α to the vertical line or the drum rotation axis 105, which is a vertical axis, as is illustrated in more detail in FIG. 6. The angle α is such that each support element 110 or support surface 111 thereof in the skirt section 151 and towards the bottom of the direct drive drum bends or leans outwardly, away from the drum rotation axis 105. Conversely, the direct drive drum 100 tapers from the bottom towards the skirt section top end 152. The support elements 110 and the direct drive elements 120 are mounted on cage mounting rings 170 and fixed thereon by fastening means such as screws 173. Alternatively, the support elements 110 and the direct drive elements 120 are fixed on the cage mounting rings 170 by welding. There are free spaces in the form of gaps 140 between each support element 110 and adjacent direct drive element 120. A support element spacer 171 is positioned between each support element 110 and each cage mounting ring 170. A drive element spacer 172 is positioned between each direct drive element 120 and each cage mounting ring 170. Overall, the direct drive drum 100 has an almost cylindrical (in case of sufficiently convex belt support surfaces 111) or quasi-cylindrical (in case of flat belt support surfaces 111) shape and a corresponding circumferential belt support surface 130. The support elements 110, direct drive elements 120 and cage mounting rings 170, which are assembled using screws 173 and spacers 171 and 172, form a cage or cage structure. Alternative embodiments without support element spacer 171 and/or without drive element spacer 172 are also conceivable. Spacers are used in particular in connection with the retrofitting of already existing drums comprising a plurality of support elements, for example by removing every second support element and replacing it with a direct drive element 120.

Figure 4:
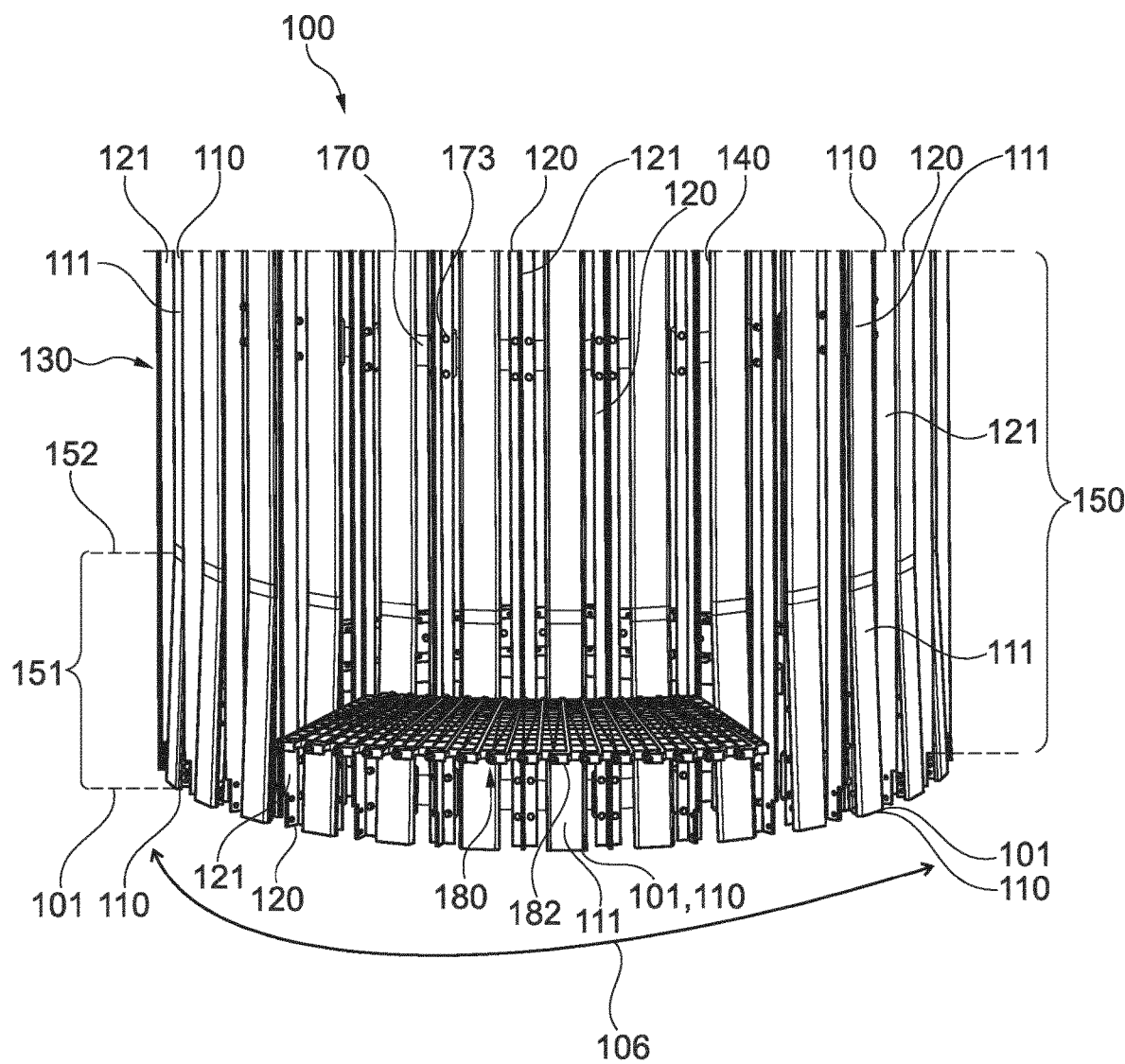
FIG. 4 is a perspective view of a lower section of the direct drive drum of FIG. 3 together with a section of a modular conveyor belt.

With reference to FIG. 4, the modular conveyor belt 180 comprises a plurality of belt modules 182. Adjacent belt modules 182 are connected by intercalating link ends linked by pivot rods extending through holes, particularly oval shaped holes or slots slightly larger in diameter than the diameter of the pivot rods and present in all link ends, the holes or slots allowing the pivot rods to move to some extent in the direction of belt travel and in the opposite direction thereby forming a somewhat flexible connection between the belt modules 182, hence creating a modular conveyor belt 180 which is bendable in two directions, namely—seen in the direction of belt travel—up and down and sideways, i.e. towards the direct drive drum 100 and/or its circumferential belt support surface 130 and away from it.

With reference to FIGS. 2 to 5, the individual belt support surfaces 111 of the support elements 110 together define a circumferential belt support surface 130 of the direct drive drum 100, which supports and guides the modular conveyor belt 180. Owing to the presence of the direct drive elements 120 and a gap 140 between each support element and adjacent direct drive element 120, the circumferential belt support surface 130 is strictly speaking not a continuous surface and thus a partially imaginary surface, even though its position and curvature are clearly defined by the support elements 110 and their belt support surfaces 111.

With reference to FIGS. 1 to 5, the support elements 110 and the direct drive elements 120 are arranged in circumferential direction 106 of the direct drive drum in an alternating sequence with each support element 110 followed next by one direct drive element 120, and with each direct drive element 120 followed next by one support element 110. In alternative embodiments, each support element may be followed next by two or more direct drive elements, or each direct drive element may be followed next by two or more support elements. Each support element 110 is a bar, plate or sheet and is preferably made of metal or plastic. Each support element 110 has a belt support surface 111 on a side distant and pointing (in a radial direction) away from the drum rotation axis 105 and towards the modular conveyor belt 180 in order to support the modular conveyor belt. Preferably the support surface 111 additionally guides the modular conveyor belt 180. Preferably the support surface 111 is a flat surface or a convex surface. Each direct drive element 120 comprises a drive rib 121 extending in a radial direction 108 away from the drum rotation axis 105 and protruding beyond an adjacent support element 110 over at least a section 150 of the direct drive drum and towards the modular conveyor belt 180 in order to engage and drive the modular conveyor belt 180.

Figure 3:
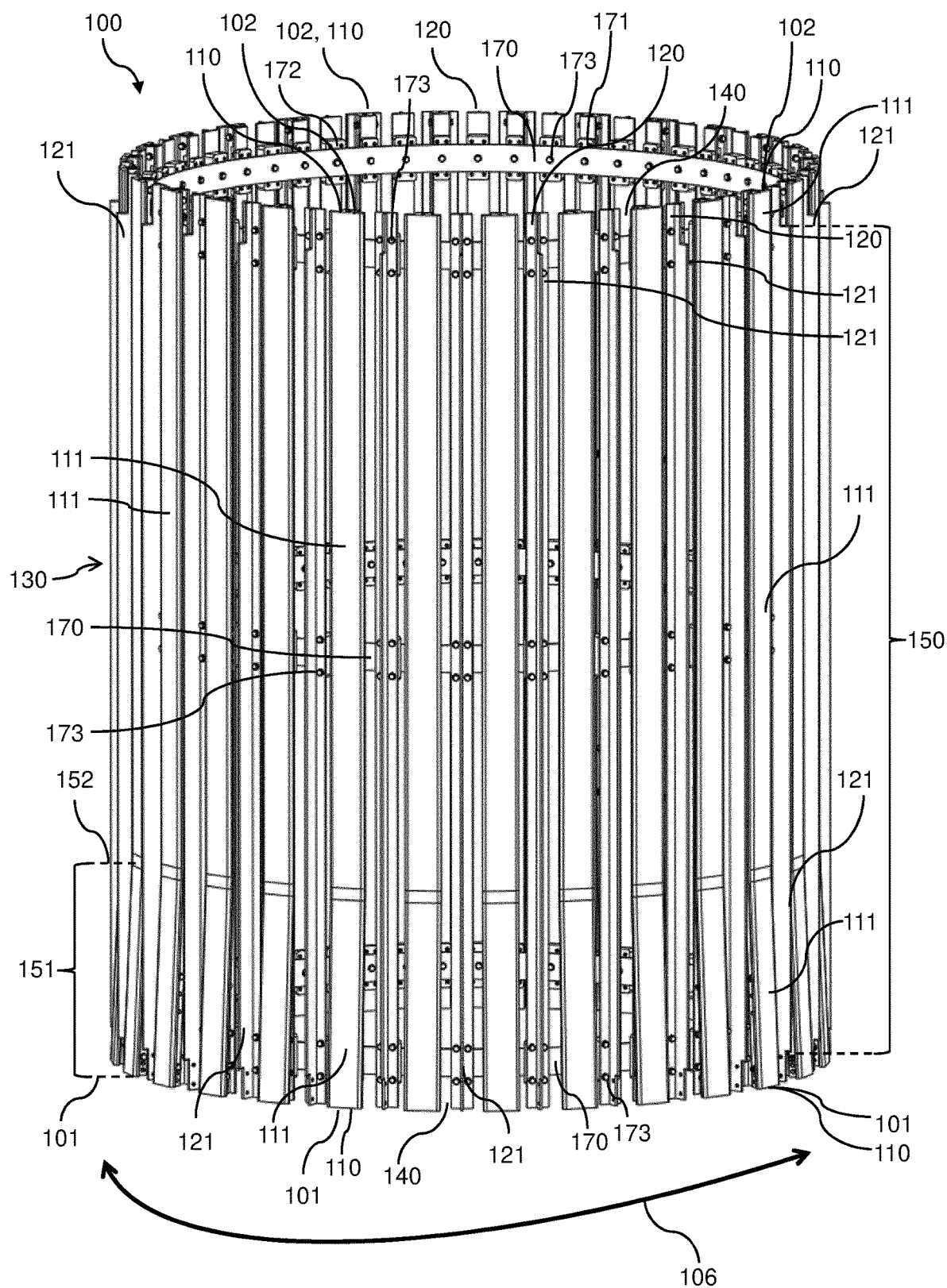
FIG. 3 is a perspective view of the direct drive drum of the spiral conveyor system of FIG. 1.

The section 150 of the direct drive drum 100 is best shown in FIGS. 3 to 5. It is a portion of the direct drum which extends vertically or in a vertical direction over a certain portion of the height (height section or vertical section) of the direct drive drum 100 and extends circumferentially or in a circumferential direction 106 all the way around the direct drive drum 100. The section 150 is divided in an engagement section 155 and a direct drive section 156. Within the different sections, a support element 110 may have one or more specific properties different from a support element 110 of the other sections and/or the rest of the direct drive drum 100 and a direct drive element 120 may have one or more specific properties different from a direct drive element 120 of the other sections and/or the rest of the direct drive drum 100. For instance, said properties may be the size or dimensions (length, width, height) of the support element 110 and/or direct drive element 120, in particular the position such as the angle α between the belt support surface 111 and the drum rotation axis 105 or vertical axis, and/or the height or protrusion height h of a direct drive element 120 or its drive rib 121, as illustrated in FIG. 6. It can also be the material that is different in different sections, for example plastic with a low coefficient of friction in one section and steel with a high coefficient of friction in another section.

As can be seen in FIGS. 3 to 6, the skirt section 151 extends upwards from a lower support end 101 of the direct drive drum and comprises a skirt section top end 152 at a height lower than an upper support end 102 of the direct drive drum 100, wherein in the skirt section 151 the belt support surfaces 111 of the support elements 110 are arranged at an angle α with respect to the drum rotation axis 105 of from 0.5° to 30°, preferably of from 0.5° to 15°, more preferably of from 0.5° to 10°, yet more preferably of from 0.5° to 7.5°, and most preferably of from 0.5° to 5°, e.g. 1° or 3.5°.

The skirt section top end 152 may be located at or formed by the kink created in each support element 110 by bending of the support element 110—seen towards the bottom of the direct drive drum 100—outwardly and at the angle α (described herein) within the skirt section 151 of the direct drive drum 100.

Each direct drive element 120 extends into the skirt section 151. As can be best seen in FIGS. 5 and 6, the skirt section 151 comprises a collapse section 153, in which no drive element 120 or drive rib 121 thereof protrudes in a radial direction 108 away from the drum rotation axis 105 beyond an adjacent support element 110, and an engagement section 155 adjacent to and above from the collapse section 153 in which a protrusion 160 of each direct drive element 120 in a radial direction away from the drum rotation axis extends beyond an adjacent support element 110 and has a protrusion height h which increases in a direction away from the collapse section 153 and towards the skirt section top end 152. The drive rib 121 of a direct drive element 120 does not extend into the collapse section 153.

This increasing protrusion of each drive rib 121 over the skirt section 151 has the effect that the modular conveyor belt 180 is not engaged by the drive ribs 121 in the collapse section 153 at and near the bottom of the direct drive drum, and is more and more engaged by the drive ribs 121 as the modular conveyor belt travels up and around the skirt section 151 of the direct drive drum 100. This gives sufficient time for the belt modules 182 to re-align and change distances between each other as is necessary when the modular conveyor belt 180 is forced to change from a previously straight direction of travel to a circular direction of travel around the direct drive drum 100 during the collapse phase. In this way tension within the modular conveyor belt is reduced.

The direct drive drum 100 further comprises a direct drive section 156 adjacent to and above from the engagement section 155, in which the protrusion height h of each direct drive element 120 in a radial direction 108 away from the drum rotation axis 105 beyond an adjacent support element 110 is constant.

The direct drive drum 100 also comprises a disengagement section 158, in which no direct drive element 120 or its drive rib 121 protrudes in a radial direction 108 away from the drum rotation axis 105 beyond an adjacent support element 110. In fact, the drive rib 121 of a direct drive element 120 does not extend into the disengagement section 158. Due to this arrangement, the direct drive elements 120 within the disengagement section 158 do not engage the modular conveyor belt 180. The role of the disengagement section 158 is to prepare the modular conveyor belt 180 for its release from the direct drive drum 100 and to eventually release the modular conveyor belt 180 therefrom. Accordingly, no protrusion of a direct drive element 120 in the disengagement section 158 leads to no direct drive element 120 engaging the modular conveyor belt 180 in the disengagement section 158, i.e. the direct drive elements 120 do not transmit force (by pushing against individual modules 182 of the modular conveyor belt) to the modular conveyor belt 180. In other words, in the disengagement section 158 the modular conveyor belt 180 is supported by the direct drive drum 100, but not engaged by a direct drive element 120. This advantageously facilitates the release of the modular conveyor belt 180 from the direct drive drum 100 and re-alignment of its belt modules 182 from a circular to a linear alignment; it also reduces the adherence of the modular conveyor belt 180 to the direct drive drum 100 and hence facilitates its release therefrom.

With reference to FIG. 7, the direct drive drum 100 rotates in a—seen from above—clockwise direction 107a around the drum rotation axis 105, thereby supporting and driving the modular conveyor belt 180, which thus travels in a clockwise direction 107a up and around the direct drive drum 100. The modular conveyor belt 180 is fed to the direct drive drum 100 in an infeed section 159a, in which the modular conveyor belt 180 is not yet supported by (the support elements 110 of) the direct drive drum 100. After the infeed section 159a follows the collapse section 153, in which the modular conveyor belt 180 is supported by the support elements 110 of the direct drive drum 100 in a direction towards the drum rotation axis 105, but not yet engaged by the direct drive elements 120 and their drive ribs 121. After the collapse section 153 follows the engagement section 155, in which the drive ribs 121 of the direct drive elements 120 more and more engage the modular conveyor belt 180, then the direct drive section 156, in which the drive ribs 121 of the direct drive elements 120 fully engage the modular conveyor belt 180, then the disengagement section 158 (not indicated as such in FIG. 7), in which the modular conveyor belt 180 is still supported by the support elements 110, but not anymore engaged by the direct drive elements 120, and finally the outlet section 159b, in which the modular conveyor belt 180 leaves the direct drive drum 100. The infeed section 159a is located at or near point P1, while the outlet section 159b is located at or near point P2. In the shown embodiment the angle between infeed and outfeed is 180°. Of course other angles are possible.

In a variant of this embodiment, as already described herein, the modular conveyor belt travels in the opposite, anti-clockwise direction 107b down and around the direct drive drum 100. Accordingly, the direct drive drum 100 rotates in the anti-clockwise direction 107b, the infeed section is located at or near point P2 and the outlet section is located at or near point P1.

In further, not shown variants of this embodiment the modular conveyor belt 180 travels in the clockwise direction 107a down and around the direct drive drum 100, with the infeed section located at the top and the outlet section located at the bottom of the direct drive drum 100, or travels in the anti-clockwise direction 107b up and around the direct drive drum 100, with the infeed section located at the bottom and the outlet section located at the top of the direct drive drum 100.

In the variants described before for this embodiment the modular conveyor belt travels between infeed section 159a and outlet section 159b through the other sections 153, 155 and 156 in a sequence corresponding to what is described above for this embodiment.

The rotation angle ρ is defined as the angle of overall rotation of the direct drive drum 100 from its position at which it starts supporting a particular belt module 182 to its position at which the same belt module 182 has reached a certain position on the direct drive drum 100. It is used herein to describe the position of a particular belt module 182 on the direct drive drum 100 while it travels up and around the direct drive drum 100, and to describe the extent to which a particular section of the direct drive drum 100, such as the collapse section 153, engagement section 155, direct drive section 156 and/or disengagement section 158, supports a belt module 182 while it travels up and around the direct drive drum 100.

Accordingly, at position ρ=0° a belt module 182 starts being supported by the direct drive drum 100, i.e. at the beginning of the collapse section 153. Typically at ρ=n× 360°+180° (or a different angle) with n being an integer of from 5 to 20 or even much higher, preferably of from 5 to 15, more preferably of from 8 to 12, a belt module 182 ends being supported by the direct drive drum 100 and leaves the direct drive drum 100 in the disengagement section 158.

A belt module 182 remains, depending on the size, in particular the overall height of the direct drive drum 100, for example
- in the collapse section 153 for ρ from 0° to 720°, preferably from 0° to 180°, most preferably from 0° to 45°, and/or
- in the engagement section 155 for further from 30° to 180°, preferably from 40° to 120°, most preferably from 45° to 90°,
- in the direct drive section 156 for ρ from 75° to n×360° with n being an integer of from 1 to 100, from 1 to 90, from 1 to 80, from 1 to 70, from 1 to 60, from 1 to 50, from 1 to 40, from 1 to 30, from 1 to 20 or from 1 to 10, and/or
- in the disengagement section 158 for further at least 30°, preferably further at least 40°, more preferably further at least 45°, yet more preferably further up to 360°, most preferably further 30° to 360°.

Figure 8:
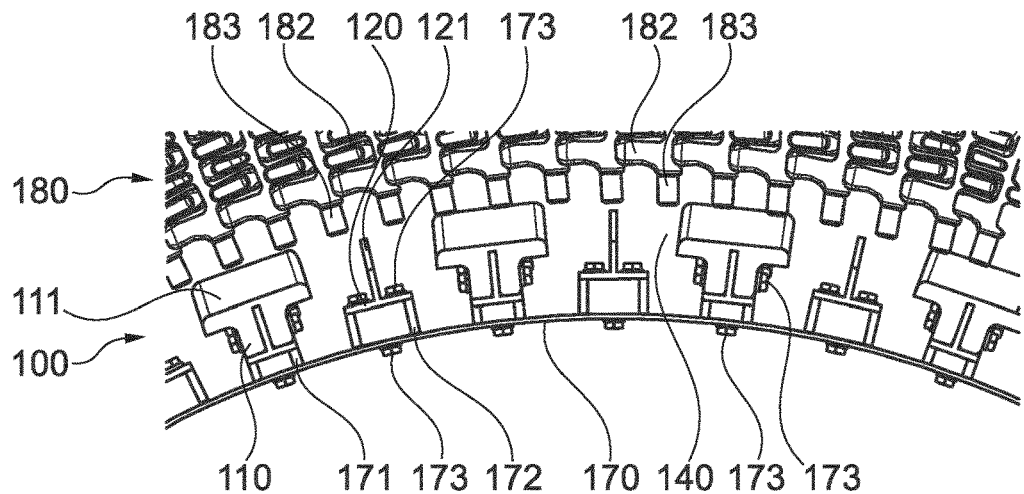
FIGS. 8 to 10 are partially schematic top views of a detail of the spiral conveyor system according to the embodiment illustrated in FIGS. 1 to 7 in different stages of engagement as follows.
Figure 9:
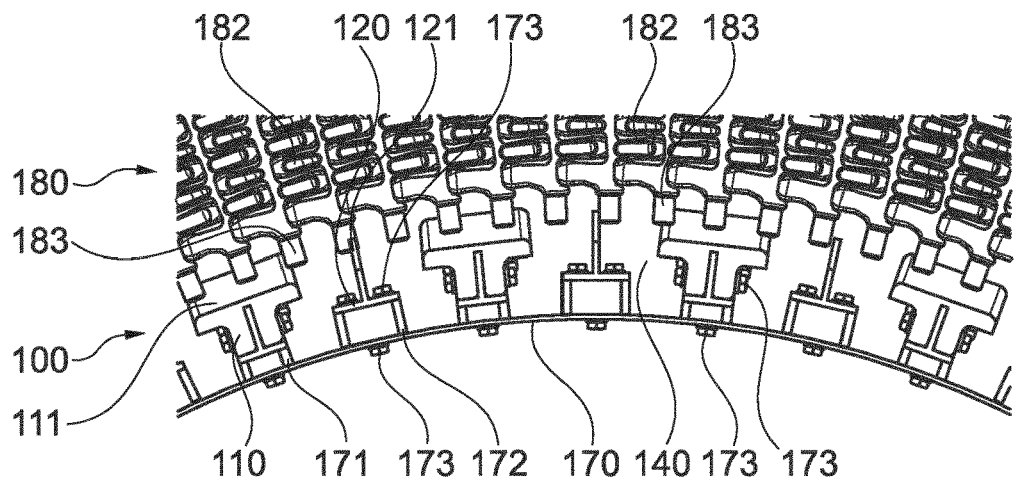
Figure 10:
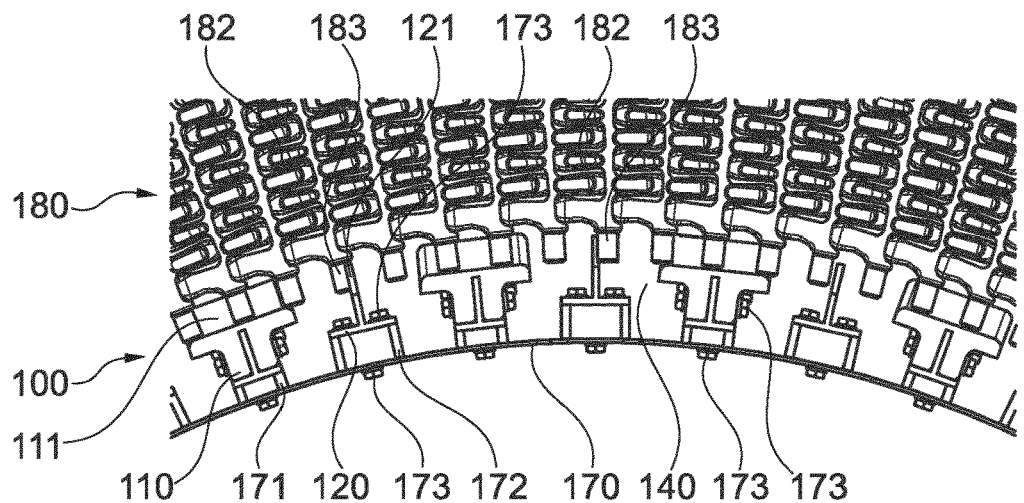

With reference to FIGS. 8, 9 and 10, support elements 110 and direct drive elements 120 are mounted on the cage mounting rings 170 of the direct drive drum 100, using support element spacers 171 and drive element spacers 172, respectively, and screws 173. The direct drive drum 100 supports with its support elements 110 the modular conveyor belt 180 in that the support surface 111 of each support element 110 contacts at least one of the cams 183 which protrudes from each of the belt modules 182 of the modular conveyor belt 180 in a direction towards the drum rotation axis 105. Each support surface 111 runs obliquely downwards to the outside away from the drum rotation axis 105. Between each support element 110 and an adjacent direct drive element 120 there is a gap 140.

FIGS. 8, 9 and 10 illustrate different stages of engagement of the cams 183 of the modular conveyor belt 180 by the drive ribs 121 of the direct drive elements 120 during rotation of the direct drive drum 100 as follows:

FIG. 8 illustrates the situation in the collapse section 153 or the disengagement section 158 of the direct drive drum 100 in which the drive ribs 121 do not engage the cams 183, as the direct drive elements 120 with their drive ribs 121 do not protrude beyond their adjacent support elements 110;

FIG. 9 illustrates the situation in the engagement section 155 of the direct drive drum 100 in which the drive ribs 121 partially engage the cams 183, as the protrusion height of the direct drive elements 120 with their drive ribs 121 beyond their adjacent support elements 110 is still small;

FIG. 10 illustrates the situation in the direct drive section 156 of the direct drive drum 100 in which the drive ribs 121 fully engage the cams 183, as the direct drive elements 120 with their drive ribs 121 protrude beyond their adjacent support elements 110 as much as possible.

Figure 11:
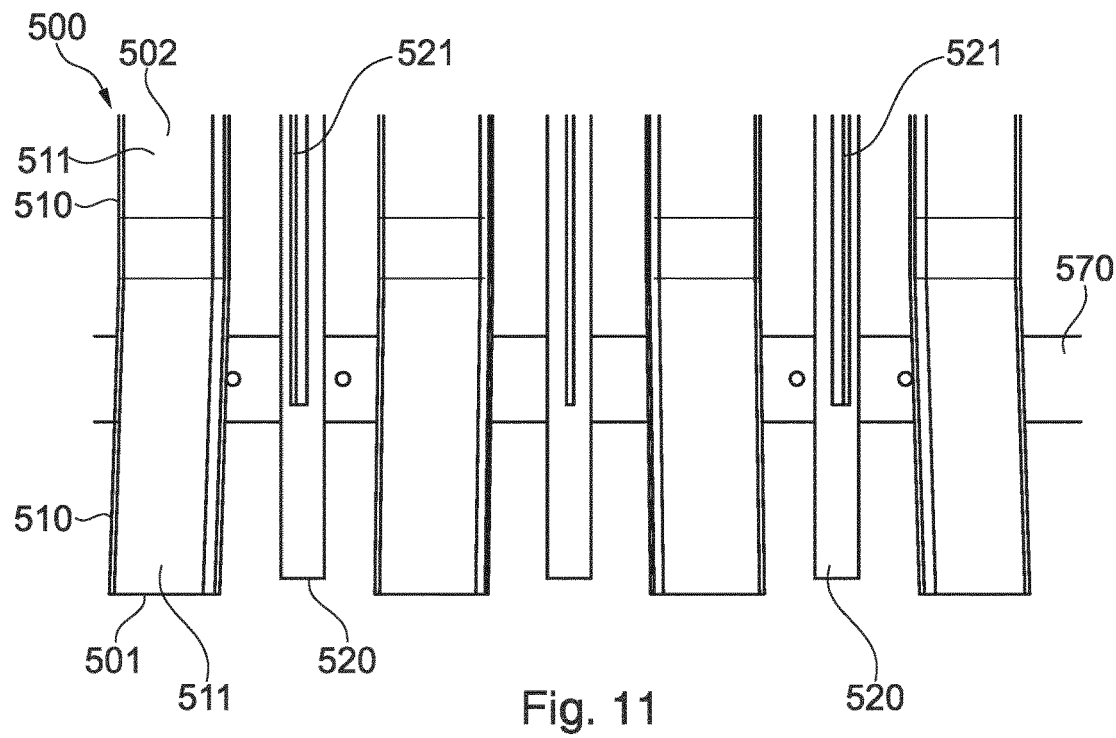
FIG. 11 is a schematic side view of a lower section of a direct drive drum according to a further embodiment.
Figure 12:
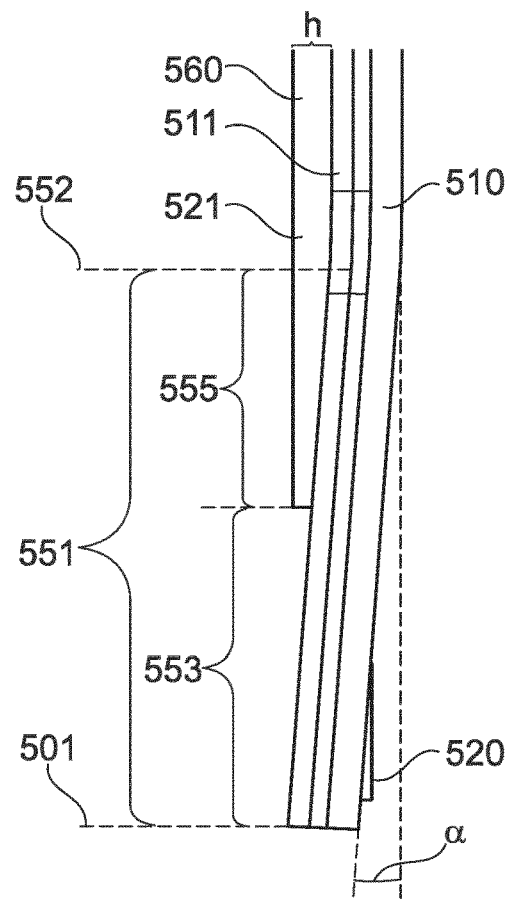
FIG. 12 is a schematic side view of a lower section of a support element and of a direct drive element of the lower section of a direct drive drum as depicted in FIG. 12.

FIGS. 11 and 12 show a further embodiment of a direct drive drum 500 according to the invention. The direct drive drum 500 comprises direct drive elements 520 with drive ribs 521 and support elements 510 with belt support surfaces 511 mounted on cage mounting rings 570. A skirt section 551 extends upwards from a lower support end 501 of the direct drive drum 500, the skirt section comprising a skirt section top end 552 at a height lower than an upper support end 502 of the direct drive drum 500. Each direct drive element 520 together with its drive rib 521 does not extend into the collapse section 553. The protrusion 560 of each direct drive element 520 in a radial direction away from the drum rotation axis beyond an adjacent support element 510 has a protrusion height h which increases in a direction away from the collapse section 553 in the engagement section 555, because the drive ribs 521 themselves have a constant height.

Figure 13:
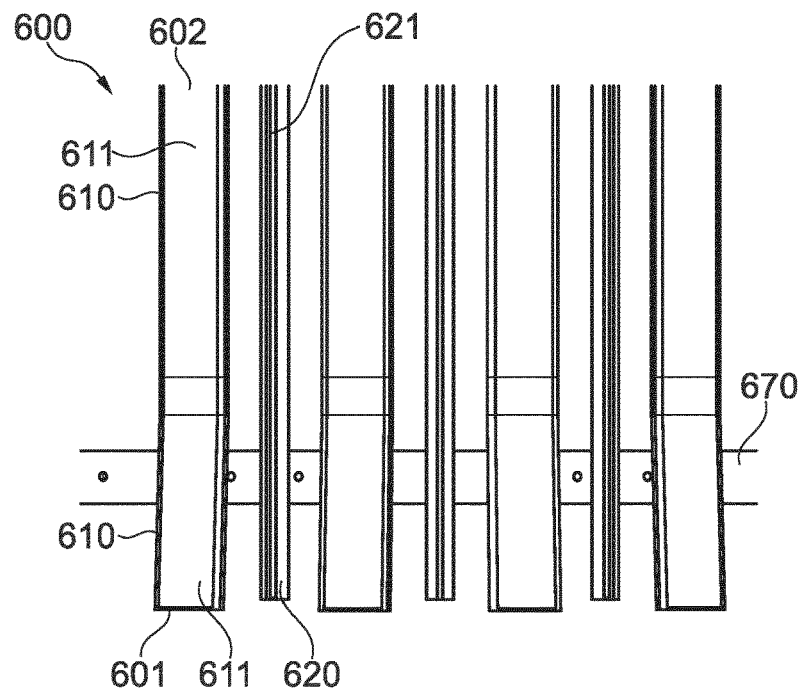
FIG. 13 is a schematic side view of a lower section of a direct drive drum according to yet a further embodiment.
Figure 14:
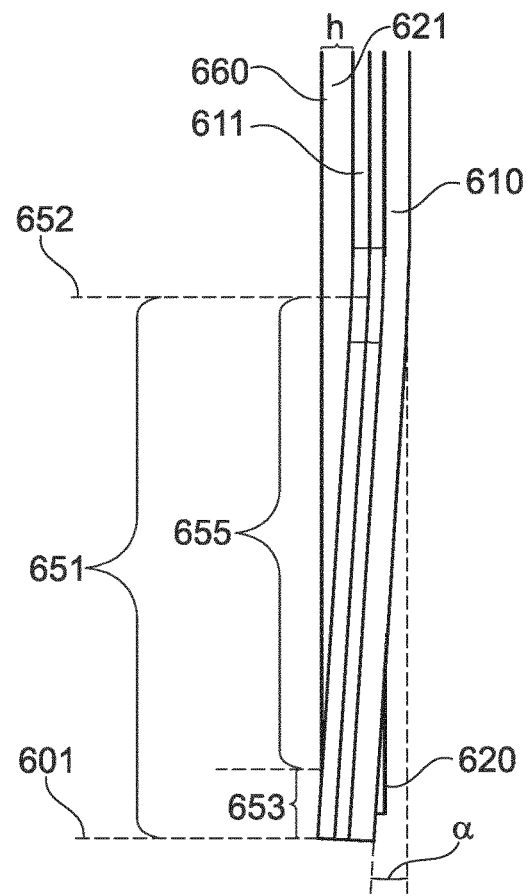
FIG. 14 is a schematic side view of a lower section of a support element and of a direct drive element of the lower section of a direct drive drum as depicted in FIG. 14.

FIGS. 13 and 14 show a further embodiment of a direct drive drum 600 according to the invention. The direct drive drum 600 comprises direct drive elements 620 with drive ribs 621 and support elements 610 with belt support surfaces 611 mounted on cage mounting rings 670. A skirt section 651 extends upwards from a lower support end 601 of the direct drive drum 600, the skirt section comprising a skirt section top end 652 at a height lower than an upper support end 602 of the direct drive drum 600. Each direct drive element 620 together with its drive rib 621 extends into the collapse section 653 even though not all the way to the lower end of the collapse section 653 being at the same level as the lower support end 601. The protrusion 660 of each direct drive element 620 in a radial direction away from the drum rotation axis beyond an adjacent support element 610 has a protrusion height h which increases in a direction away from the collapse section 653 in the engagement section 655, because the drive ribs 621 themselves have a constant height.

FIG. 15 shows a further embodiment of a direct drive drum according to the invention. The direct drive drum comprises direct drive elements 720 with drive ribs 721 and support elements 710 with belt support surfaces 711 mounted on cage mounting rings (not shown). A skirt section 751 extends upwards from a lower support end 701 of the direct drive drum, the skirt section comprising a skirt section top end 752 at a height lower than an upper support end of the direct drive drum. Each direct drive element 720 together with its drive rib 721 extends into the collapse section 753, but the drive rib 721 has two different, but constant heights above a flange 726, a smaller height in a kerning or recess near and at the bottom and a larger height above the kerning. Thus, the drive rib 721 in the kerning or recess has no protrusion above the adjacent belt support surface 711, whereas the drive rib 721 above the kerning or recess has a protrusion above the adjacent belt support surface 711 with a protrusion height increasing in a direction away from the kerning upwards in the engagement section 755. This portion of the drive rib 721 above the kerning or recess is the effective drive portion of the drive rib 721 and has a chamfer at the end 725 directed towards the kerning or recess to facilitate engagement of a modular conveyor belt.

Direct drive drums according to the invention may be embodied with different lengths and shapes of a drive rib of a direct drive element of the direct drive drum, i.e. in one embodiment a drive rib 121 (at least the drive portion thereof) does not extend into the collapse section 153 (FIGS. 5 and 6) and does not extend into the disengagement section 158 (FIG. 5), in another embodiment the effective drive portion of a drive rib 721 does not extend into the collapse section 753 (FIG. 15), in yet another embodiment a drive rib 821 does fully extend into the collapse section 853 and to the lower end of the collapse section 853 being at the same level as the lower support end 801 (FIGS. 16 to 18), and in a further embodiment the drive portion of a drive rib 921 does not extend itself into the collapse section 953 (FIGS. 19 to 22), but can be extended into the collapse section 953 by a short drive rib extension piece 923 (FIG. 21) or a long drive rib extension piece 924 (FIG. 22) of a direct drive element 920, attached for instance by at least two screws 973 each put through a bore 922 in the direct drive element 920 (FIGS. 21 and 22).

In further embodiments of a direct drive drum 1000, 1100, 1200, 1300, 1400, 1500, 1600, 1700, 1800, 1900, 2000, 2100 and 2200 according to the invention as shown in FIGS. 23 to 35 each direct drive element 1020, 1120, 1220, 1320, 1420, 1520, 1620, 1720, 1820, 1920, 2020, 2120 and 2220 is configured as a T bar comprising a drive rib 1021, 1121, 1221, 1321, 1421, 1521, 1621, 1721, 1821, 1921, 2021, 2121 and 2221 as its web and a flange 1026, 1126, 1226, 1326, 1426, 1526, 1626, 1726, 1820, 1926, 2026, 2126 and 2226. The lower section of the direct drive drum 1000, 1100, 1200, 1300, 1400, 1500, 1600, 1700, 1800, 1900, 2000, 2100 and 2200 and of each direct drive element 1020, 1120, 1220, 1320, 1420, 1520, 1620, 1720, 1820, 1920, 2020, 2120 and 2220 and its drive rib 11021, 1121, 1221, 1321, 1421, 1521, 1621, 1721, 1821, 1921, 2021, 2121 and 2221, as shown in FIGS. 23 to 35, form part of the skirt section. In the skirt section the belt support surfaces 1011 of the support elements 1010 are arranged at an angle (skirt angle, slope angle) of from 0.5° to 30°, preferably of from 0.5° to 15°, more preferably of from 0.5° to 10°, yet more preferably of from 0.5° to 7.5°, and most preferably of from 0.5° to 5°, e.g. 1° or 3.5°, with respect to the drum rotation axis. The lower section of each drive rib 1021, 1121, 1221, 1321, 1421, 1521, 1621, 1721, 1821, 1921, 2021, 2121 and 2221 has—in order to allow for an optimised, smooth interaction with a modular conveyor belt of a particular type or design—a shape as shown in FIGS. 23 to 35 and as described as follows (the embodiments shown in FIGS. 23 to 35 are quite similar in that they only differ in the shape of the drive ribs 1021, 1121, 1221, 1321, 1421, 1521, 1621, 1721, 1821, 1921, 2021, 2121 and 2221 and hence the direct drive elements 1020, 1120, 1220, 1320, 1420, 1520, 1620, 1720, 1820, 1920, 2020, 2120 and 2220 as a whole and the protrusion and protrusion height thereof—in each of the FIGS. 23 to 35 seen in a radial direction away from the drum rotation axis—above adjacent belt support surfaces 1011, whereas for instance the support elements 1010 (shown in FIGS. 23 to 35, but not designated with this reference sign in FIGS. 23 to 35) and their belt support surfaces 1011 remain the same). The lower section of the direct drive drum 1000, 1100, 1200, 1300, 1400, 1500, 1600, 1700, 1800, 1900, 2000, 2100 and 2200 (and its skirt section), in which the protrusion height of the protrusion of the drive rib 1021, 1121, 1221, 1321, 1421, 1521, 1621, 1721, 1821, 1921, 2021, 2121 and 2221 above the two adjacent belt support surfaces 1011 is zero, is referred to as the collapse section of the direct drive drum.

Figure 23:
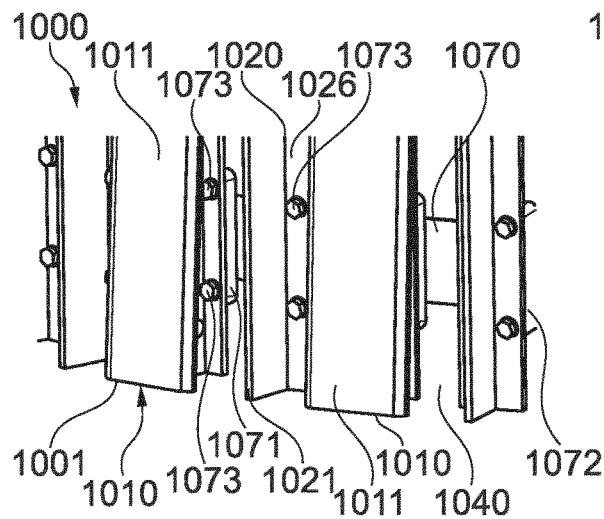

In FIG. 23 the drive rib 1021 has a constant height above the flange 1026 and has a protrusion with a protrusion height in a radial direction away from the drum rotation axis above the two adjacent belt support surfaces 1011 which is zero (0) at the bottom and increasing from the bottom upwards within the skirt section. Each support element 1010 extends from a lower support end 1001 with a belt support surface 1011, whereby each support element 1010 and each direct drive element 1020 is mounted on the cage mounting ring 1070 using a support element spacer 1071 and a drive element spacer 1072, respectively, and screws 1073; there is a gap 1040 between a support element 1010 and an adjacent direct drive element 1020.

Figure 24:
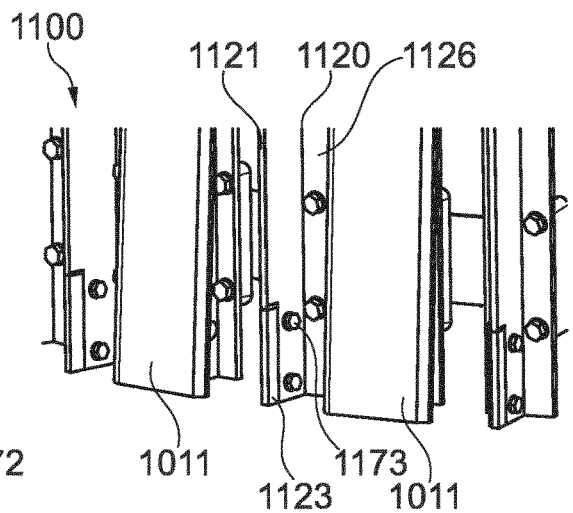

In FIG. 24 the drive rib 1121 follows a vertical straight line with a kerning or recess near and at the bottom where the drive rib 1121 is extended to the bottom by a short drive rib extension piece 1123, which is attached to the remainder of the direct drive element 1120 by screws 1173 and fills the said kerning (similar to the direct drive element 920, drive rib 921 and extension pieces 923 and 924 as depicted in FIGS. 19 to 22). The drive rib 1121 and the short drive rib extension piece 1123 have a constant height above the flange 1126. Thus, the drive rib 1121 and the short drive rib extension piece 1123 have a protrusion with a protrusion height above the two adjacent belt support surfaces 1011 which is zero (0) at the bottom and increasing from the bottom upwards within the skirt section.

Figure 25:
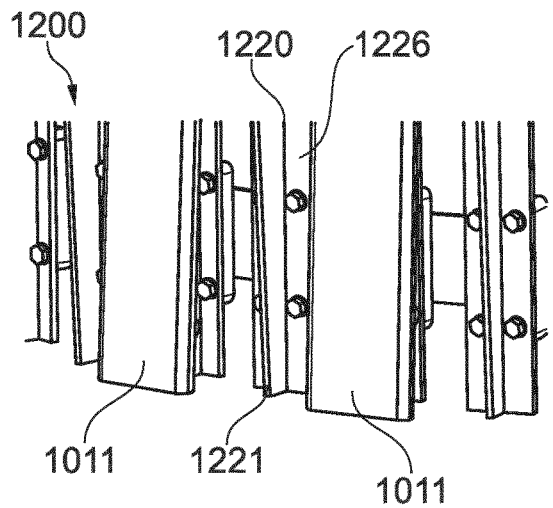

In FIG. 25 the drive rib 1221 follows a straight line from the bottom upwards obliquely with respect to the drum rotation axis, and is—seen from below—overhanging at an angle of 5°. The drive rib 1221 has a height above the flange 1226 which increases at a constant gradient from the bottom upwards. Thus, the drive rib 1221 only from some point on upwards has a protrusion above the two adjacent belt support surfaces 1011 with a protrusion height increasing upwards within the skirt section.

Figure 26:
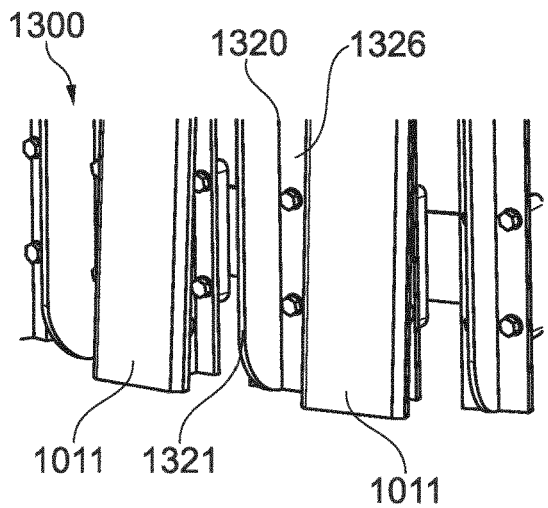

In FIG. 26 the drive rib 1321 first follows a convexly curved line or convex curvature extending from the bottom upwards and then follows a vertical straight line. The drive rib 1321 has a height above the flange 1326 which increases from 0 at the bottom at a decreasing gradient along the curvature and then remains constant. Thus, the drive rib 1321 only from some point on upwards has a protrusion above the two adjacent belt support surfaces 1011 with a protrusion height increasing upwards within the skirt section.

Figure 27:
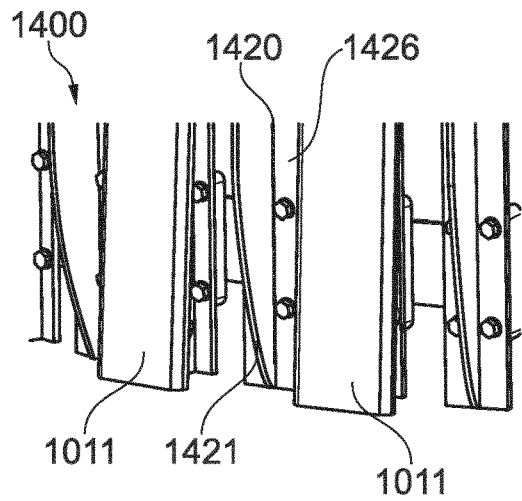

In FIG. 27 the drive rib 1421 first follows a convexly curved line or convex curvature extending from the bottom upwards and then follows a vertical straight line. The drive rib 1421 has a height above the flange 1426 which increases from the bottom at a decreasing gradient along the curvature and then remains constant, whereby the gradient at the bottom is much smaller and the gradient decreases more slowly than in FIG. 26. Thus, the drive rib 1421 only from a certain point within the curvature upwards has a protrusion above the two adjacent belt support surfaces 1011 with a protrusion height increasing upwards within the skirt section.

Figure 28:
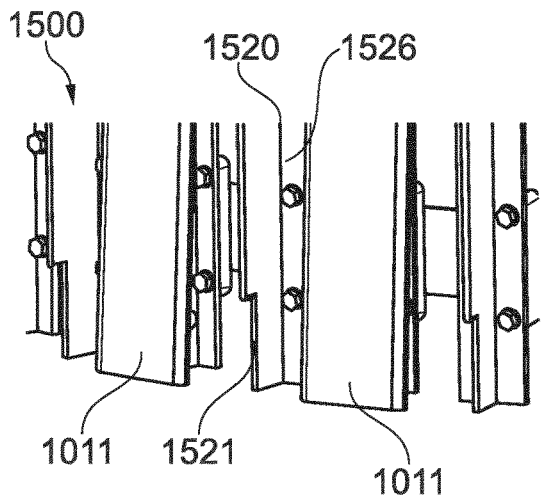

In FIG. 28 the drive rib 1521 follows a vertical straight line with a kerning or recess near and at the bottom (similar to the direct drive elements 120 and 720 and drive ribs 121 and 721 as depicted in FIGS. 1, 3 to 5 and 15). The drive rib 1521 has two different, but constant heights above the flange 1526, a smaller height in the kerning or recess and larger height above the kerning. Thus, the drive rib 1521 in the kerning or recess has no protrusion above the two adjacent belt support surfaces 1011, whereas the drive rib 1521 above the kerning or recess has a protrusion above the two adjacent belt support surfaces 1011 with a protrusion height increasing from the kerning upwards within the skirt section.

Figure 29:
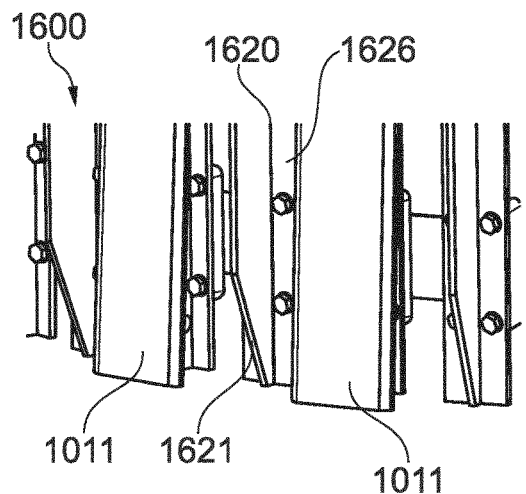

In FIG. 29 the drive rib 1621 follows a straight line from the bottom upwards obliquely with respect to the drum rotation axis while—seen from below—overhanging at an angle of 20°, then follows a vertical straight line upwards. The drive rib 1621 has a height above the flange 1626 which first increases at a constant gradient from the bottom upwards and then remains constant. Thus, the drive rib 1621 only from some point on upwards has a protrusion with a protrusion height above the two adjacent belt support surfaces 1011 increasing upwards within the skirt section.

Figure 30:
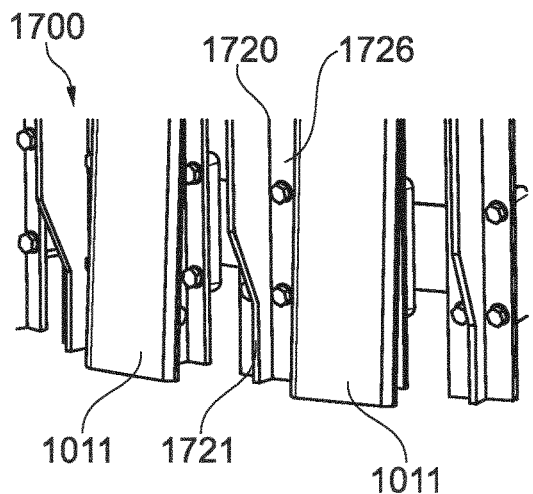

In FIG. 30 the drive rib 1721 first follows a vertical straight line from the bottom upwards, then follows a straight line obliquely with respect to the drum rotation axis which is—seen from below—overhanging at an angle of 20°, and after that follows a vertical straight line. The drive rib 1721 has a height above the flange 1726 which first remains constant from the bottom upwards, then increases at a constant gradient and then remains constant again. Thus, the drive rib 1721 only from some point on upwards has a protrusion with a protrusion height above the two adjacent belt support surfaces 1011 increasing upwards within the skirt section.

Figure 31:
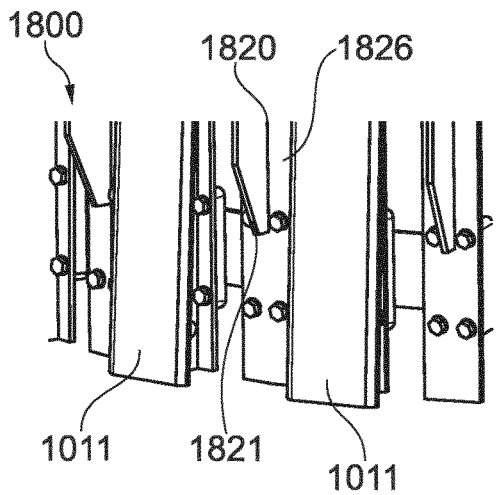

In FIG. 31 the drive rib 1821 begins only at some distance from the bottom upwards following a straight line obliquely with respect to the drum rotation axis which—seen from below—is overhanging at an angle of 20° and then follows a vertical straight line. The drive rib 1821 has a height above the flange 1826 which first is zero (0) from the bottom upwards, then jumps to a certain value from which it increases at a constant gradient and then remains constant. Thus, the drive rib 1821 only from some point on upwards has a protrusion above the two adjacent belt support surfaces 1011 with a protrusion height increasing upwards within the skirt section.

Figure 32:
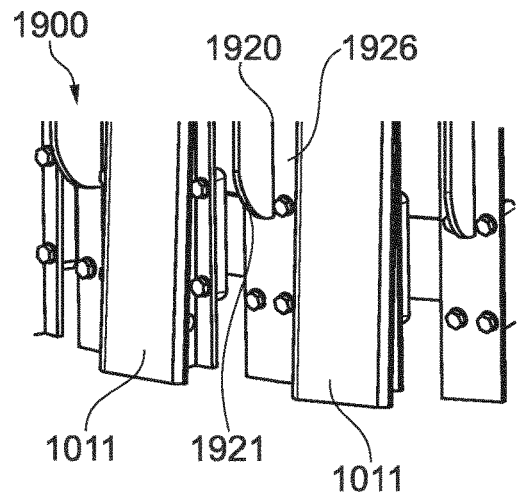

In FIG. 32 the drive rib 1921 begins only at some distance from the bottom upwards following a convexly curved line or convex curvature, extending from the flange 1926 upwards, and then follows a straight line upwards. The drive rib 1921 has a height above the flange 1926 which increases from 0 at a decreasing gradient along the curvature and then remains constant. Thus, the drive rib 1921 only from some point on upwards of the curvature has a protrusion above the two adjacent belt support surfaces 1011 with a protrusion height increasing upwards within the skirt section.

Figure 33:
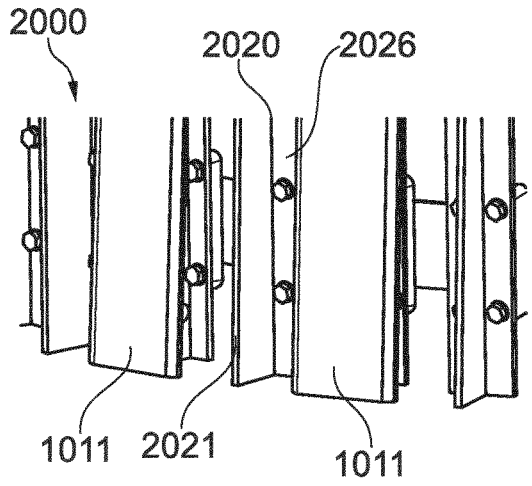

In FIG. 33 the drive rib 2021 follows a straight line, which is—seen from below—inclined towards the drum rotation axis at a slope angle preferably being the same angle at which the belt support surface 1011 is inclined towards the drum rotation axis (skirt angle, slope angle), i.e. of from 0.5° to 30°, preferably of from 0.5° to 15°, more preferably of from 0.5° to 10°, yet more preferably of from 0.5° to 7.5°, and most preferably of from 0.5° to 5°, e.g. 1° or 3.5°. The drive rib 2021 has a height above the flange 2026 which decreases at a constant gradient from the bottom upwards. Thus, the drive rib 2021 has a protrusion above the two adjacent belt support surfaces 1011 with a protrusion height remaining constant within the skirt section.

Figure 34:
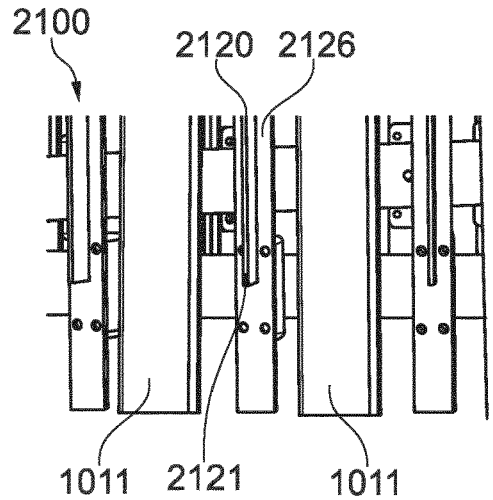

In FIG. 34 the drive rib 2121 begins only at some distance from the bottom upwards following a straight vertical line upwards. The drive rib 2121 has a constant height above the flange 2126. Thus, the drive rib 2121 has a protrusion above the two adjacent belt support surfaces 1011 with a protrusion height increasing upwards within the skirt section.

Figure 35:
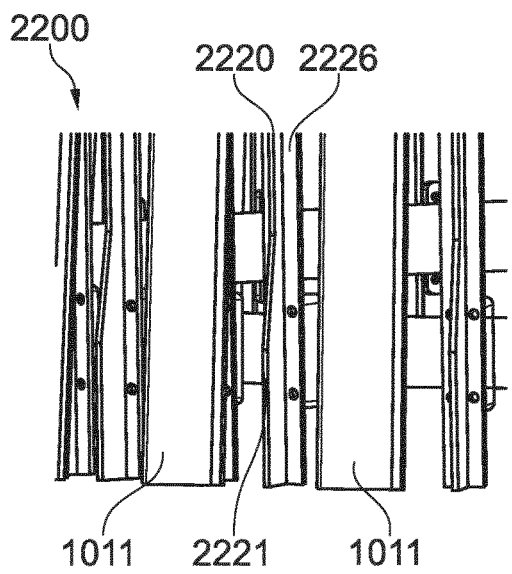

In FIG. 35 the drive rib 2221 first follows a vertical straight line extending upwards from the bottom, then follows a straight line which—seen from below—is inclined towards the drum rotation axis at a slope angle of from 1° to 45°, preferably of from 10° to 45°, more preferably of from 10° to 35°, most preferably of from 15° to 30°, e.g. 20°, and finally follows a vertical straight line further upwards. The drive rib 2221 has a height above the flange 2226 which first is constant from the bottom upwards, then decreases at a constant gradient further upwards and then remains constant still further upwards. Thus, the drive rib 2221 has a protrusion above the two adjacent belt support surfaces 1011 with a protrusion height increasing from the bottom upwards within the skirt section and then still in the skirt section decreases until the protrusion disappears.

Figure 36:
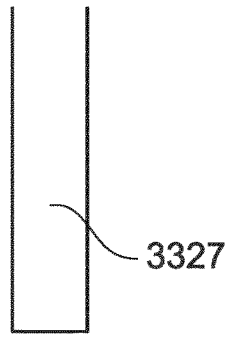
Figure 37:
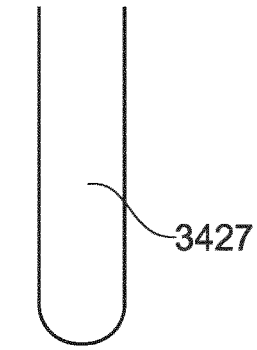
Figure 38:
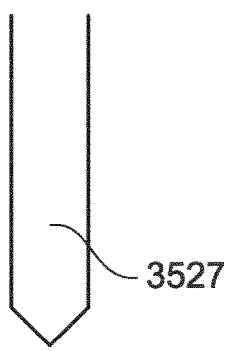
Figure 39:
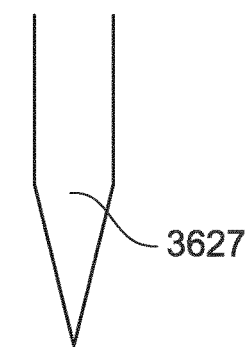
Figure 40:
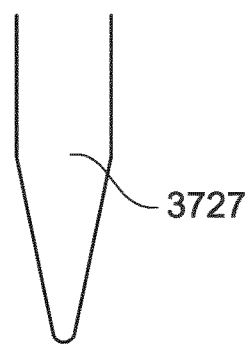
Figure 41:
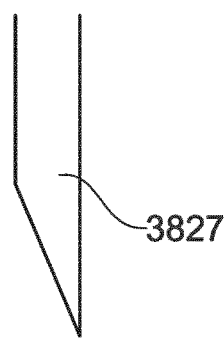
Figure 42:
Figure 43:
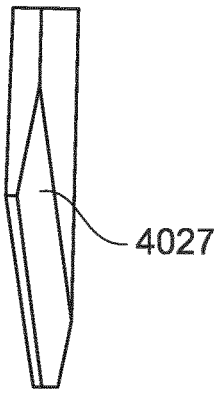
Figure 44:
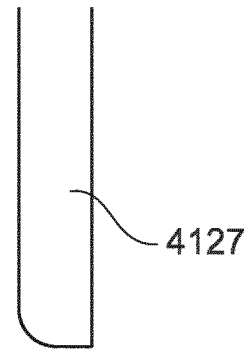
Figure 45:
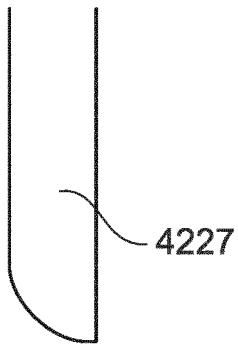

With reference to FIGS. 36 to 47, the drive ribs of the direct drive elements of direct drive drums according to the invention can be embodied with various cross sectional profiles 3327, 3427, 3527, 3627, 3727, 3827, 3927, 4027, 4127, 4227, 4327 and 4427 in order to accommodate a particular type or design of modular conveyor belt and allow for an optimised, smooth interaction therewith. Each cross sectional profile 3327, 3427, 3527, 3627, 3727, 3827, 3927, 4027, 4127, 4227, 4327 and 4427 is seen from the top or bottom end of a direct drive element mounted on the direct drive drum. The open top end (without a line drawn) faces towards the drum rotation axis, whereas the (blunt, rounded, curved or pointed) bottom end points in a radial direction away from the drum rotation axis or at an angle to that direction in order to engage a modular conveyor belt; the bottom end is therefore hereinafter referred to as the outer end. Thus, in further embodiments of the invention a drive rib has a cross sectional profile (extending perpendicular to its longitudinal axis, i.e. seen from either end of the drive rib or from the top or bottom of the direct drive drum) as shown in FIGS. 36 to 47 and as follows:

FIG. 36 shows a rectangular profile 3327;

FIG. 37 shows a rectangular profile 3427 with the outer end rounded;

FIG. 38 shows a rectangular profile 3527 with the outer end pointed like an isosceles triangle at an angle of 90°;

FIG. 39 shows a rectangular profile 3627 with the outer end pointed like an isosceles triangle at an angle of 30°;

FIG. 40 shows a rectangular profile 3727 with the outer end pointed like an isosceles triangle at an angle of 25° and the resulting tip rounded;

FIG. 41 shows a rectangular profile 3827 with the outer end pointed at an angle of 22.5° with only one of the long sides of the rectangle angled;

FIG. 42 shows a rectangular profile 3927 with the outer end pointed at an angle of 22.5° with only one of the long sides of the rectangle angled and the resulting tip rounded;

FIG. 43 shows a cuboid or bar profile 4027 with one of its edges chamfered away from the outer end;

FIG. 44 shows a rectangular profile 4127 with one of its corners at the outer end rounded at a curvature radius being equal to half (0.5) of the width of the rectangular profile 4127;

FIG. 45 shows a rectangular profile 4227 with one of its corners at the outer end rounded at a curvature radius being equal to the width of the rectangular profile 4227;

FIG. 46 shows a rectangular profile 4327 in which the rectangle at some point is angled sideways at an angle of from 1° to 45°, preferably of from 10° to 45°, more preferably of from 10° to 35°, most preferably of from 10° to 30°, e.g. 15°;

FIG. 47 shows a rectangular profile 4427 in which the rectangle from some point onwards is bent sideways in a circumferential direction of the direct drive drum in a curved line having a curvature radius being equal to 8-times the width of the rectangular profile.

FIG. 48 shows the upper section of the direct drive drum 100 of FIGS. 1 to 10 in more details.

FIGS. 49 to 52 show different embodiments of the upper section of direct drive drums 4500, 4600, 4700 and 4800 according to the invention including the upper section of the direct drive section 156 and, above it, the disengagement section 158, and in particular the upper section of its direct drive elements 4520, 4620, 4720 and 4820 and their drive ribs 4521, 4621, 4721 and 4821. In the disengagement section the height of the drive rib 4521, 4621, 4721 and 4821 above the flange 4526, 4626, 4726 and 4826, respectively, decreases, and accordingly the protrusion height of the protrusion of the drive rib 4521, 4621, 4721 and 4821 above the two adjacent belt support surfaces 4511 decreases or is zero as follows.

Figure 49:
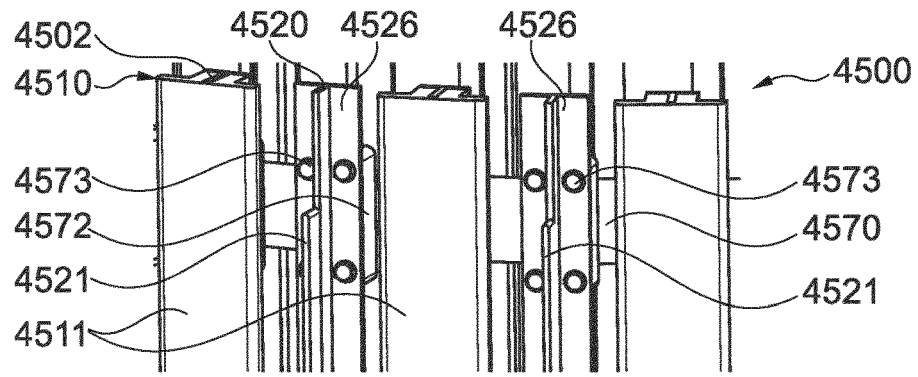

FIG. 49 shows an upper section of the direct drive drum 4500 with the upper section of a support element 4510 having a belt support surface 4511 and extending to an upper support end 4502, and the upper section of a direct drive element 4520 in the form of a T bar having a drive rib 4521 as its web and a flange 4526. The upper section of the direct drive element 4520 is mounted on a cage mounting ring 4570 using screws 4573, with a drive element spacer 4572 placed between the direct drive element 4520 and the cage mounting ring 4570. The drive rib 4521 follows a vertical straight line upwards, and then has a recess from which it continues to follow a vertical straight line to the top, where it still protrudes from the flange 4526. The drive rib 4521 has two different, but constant heights above the flange 4526, a smaller height in the recess and larger height below the recess. Thus, the drive rib 4521 has a protrusion above the two adjacent belt support surfaces 4511 with a constant protrusion height below the recess and has no protrusion from the recess upwards.

Figure 50:
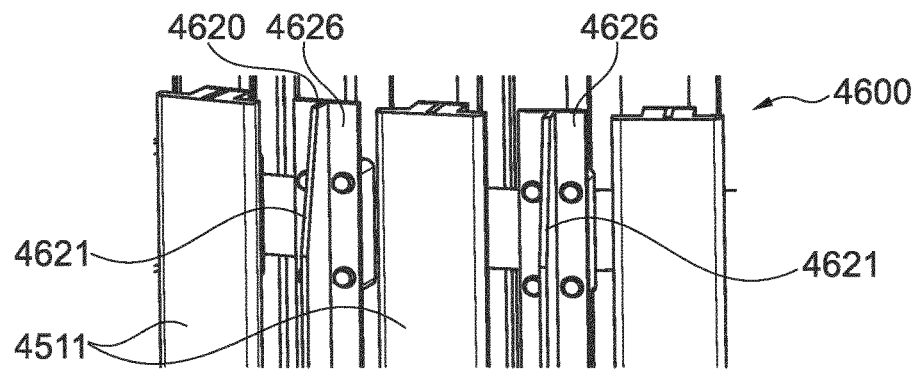

In FIG. 50 the drive rib 4621 first follows a vertical straight line upwards, and then follows a straight line, which—seen from below—is inclined towards the drum rotation axis at a slope angle of from 1° to 45°, preferably of from 10° to 45°, more preferably of from 10° to 35°, most preferably of from 10° to 30°, e.g. 10°, to the top, where it still protrudes from the flange 4626. The drive rib 4621 has a height above the flange 4626 which first remains constant and then decreases at a constant gradient until it reaches the top. Thus, the drive rib 4621 has a protrusion above the two adjacent belt support surfaces 4511 with a protrusion height first remaining constant and then further upwards constantly decreasing, with no protrusion left from a certain point, until it reaches the top.

Figure 51:
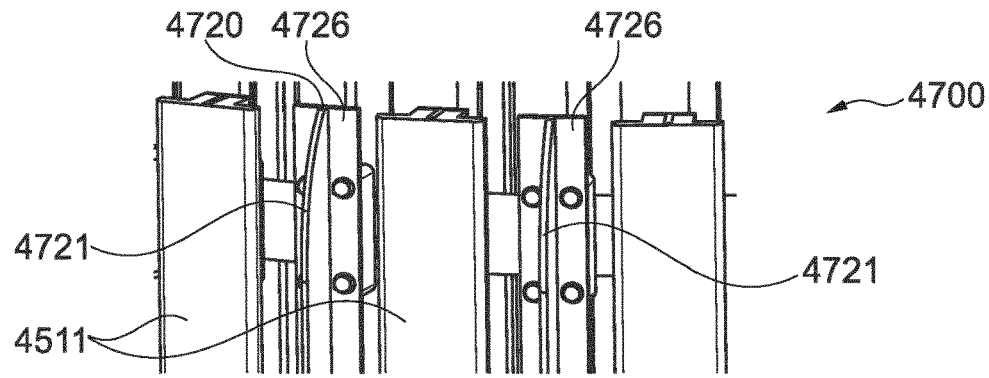

In FIG. 51 the drive rib 4721 first follows a vertical straight line upwards, and then follows an in upward direction convexly curved line or convex curvature to the top. The drive rib 4721 has a height above the flange 4726 which first remains constant and then decreases at an increasing gradient upwards along the curvature. Thus, the drive rib 4721 has a protrusion above the two adjacent belt support surfaces 4511 with a protrusion height first remaining constant and then decreasing with an increasing gradient upwards until it reaches the top, with no protrusion left from a certain point upwards.

Figure 52:
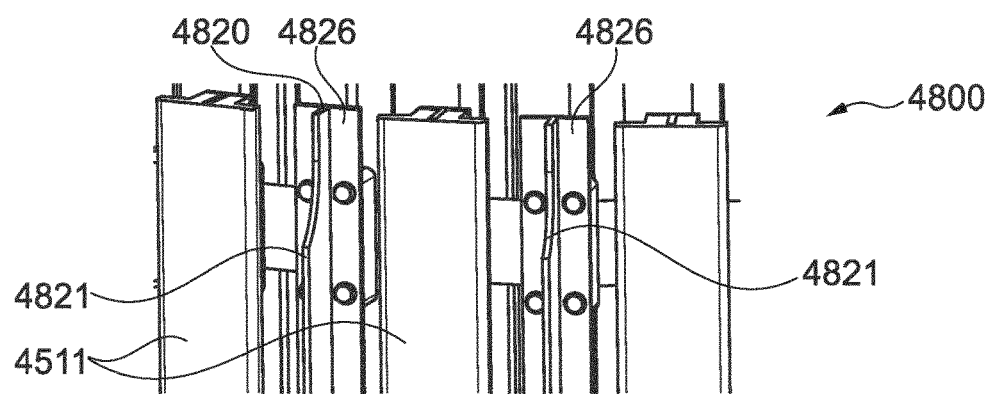

In FIG. 52 the drive rib 4821 first follows a vertical straight line upwards, and then follows an in upward direction concavely curved line or concave curvature to the top. The drive rib 4821 has a height above the flange 4826 which first remains constant and then decreases at a decreasing gradient upwards along the curvature. Thus, the drive rib 4821 has a protrusion above the two adjacent belt support surfaces 4511 with a protrusion height first remaining constant and then decreasing with a decreasing gradient upwards until it reaches the top, with no protrusion left from a certain point upwards.

FIGS. 53 and 54 each show a direct drive drum 4900 generally having the same structure as direct drive drum 100 depicted in FIGS. 1 to 10 except with the design of its upper section, which in the case of direct drive drum 4900 additionally comprises or consists of an upper skirt section 4957 (in addition to the lower skirt section 4951), and in case of FIG. 53 the guide rails 4995 and 4996 and any guide frame (not shown) which the guide rails 4995 and 4996 may form part of.

Thus, direct drive drum 4900 comprises a plurality of support elements 4910 and a plurality of direct drive elements 4920, both fixed by screws 4973 to cage mounting rings 4970, and arranged in circumferential direction 4906 of the direct drive drum 4900 separate and in a distance (caused by gaps 4940) from each other, hence forming a cylindrical or quasi-cylindrical periphery of the direct drive drum 4900. Each support element 4910 extends from a lower support end 4901 to an upper support end 4902 and has a belt support surface 4911 on a side distant and pointing away from the drum rotation axis (not shown, but located at the corresponding position of drum rotation axis 105 shown in FIGS. 2 and 7). The belt support surfaces 4911 support the modular conveyor belt 4980. Each direct drive element 4920 comprises a drive rib 4921 and engages therewith the modular conveyor belt 4980 in the same way as described herein in connection with FIGS. 1 to 10. Accordingly, apart from having a second skirt section, i.e. an upper skirt section 4957, direct drive drum 4900 functions in the same way as direct drive drum 100, the FIGS. 1 to 10 and description of which herein is thus applicable to direct drive drum 4900 as well, whereby the reference signs in FIGS. 53 and 54 ending on the same two numbers, but differing by hundreds and thousands from those reference signs used in FIGS. 1 to 10 have the same meaning as described herein in connection with FIGS. 1 to 10.

In the upper skirt section 4957 each support element 4910 and belt support surface 4911 thereof is angled at an angle α (skirt angle or slope angle, not shown in FIGS. 53 and 54, but the illustration provided in FIG. 6 applies by analogy), i.e. towards the top of the direct drive drum 4900 bends or leans outwardly, away from the drum rotation axis (not shown in FIGS. 53 and 54, but the illustration provided in FIGS. 1 to 7, with the drum rotation axis 105 shown in FIGS. 2 and 7, applies by analogy). In the upper skirt section 4957, the direct drive drum 4900 widens towards the skirt section top end, which in this case is the upper support end 4902. The skirt angle or slope angle α is of from 0.5° to 30°, preferably of from 0.5° to 15°, more preferably of from 0.5° to 10°, yet more preferably of from 0.5° to 7.5°, and most preferably of from 0.5° to 5°, e.g. 1° or 3.5°, with respect to the drum rotation axis.

The upper skirt section 4957, which can comprise a disengagement section and is provided in addition to the lower skirt section 4951, helps with the disengagement of the modular conveyor belt 4980 leaving or unwinding from the direct drive drum 4900 in case the modular conveyor belt 4980 is fed to the direct drive drum 4900 and engaged by the direct drive elements 4920 thereof in the lower skirt section 4951, which comprises a collapse and engagement section, and then runs around and upward the direct drive drum 4900.

Conversely, the modular conveyor belt 4980 can be fed to the direct drive drum 4900 and engaged by the direct drive elements 4920 thereof in the upper skirt section 4957, which in this case comprises a collapse and engagement section, and then run around and downward the direct drive drum 4900, in which case the lower skirt section 4951 comprises a disengagement section and helps with the disengagement of the modular conveyor belt 4980 leaving or unwinding from the direct drive drum 4900.

In case the second skirt section 4951 or 4957 is used to help with the disengagement of the modular conveyor belt 4980, the second skirt section 4951 or 4957 comprises the disengagement section. In this case the effect on helping with the disengagement is provided by both the disengagement section, i.e. the design of the drive ribs 4921 as described herein, and by the skirt section, i.e. by the angling of the support elements 4910 and belt support surfaces 4911 thereof as described herein.

The modular conveyor belt of the present invention may run on one or more guide rails, preferably two guide rails. The guide rails 4995 and 4996 depicted in FIG. 53 wind around the direct drive drum in a spiral and may form part of a guide frame (not shown). The guide rails 4995 and 4996 and the guide frame, if present, act as a support for the modular conveyor belt, supporting the same (from below) against the force of gravity and optionally also laterally. The guide rails 4995 and 4996 and the guide frame, if present, thereby guide the modular conveyor belt around the direct drive drum and upwards or downwards of it. The guide rails 4995 and 4996 and the guide frame, if present, may be fixed (e.g. by rods or sprockets, not shown) to the (cage structure of) direct drive drum 4900 and hence turn with the direct drive drum 4900, or, alternatively, be fixed to a cage or scaffold forming a stationary guide frame (not shown) which does not turn with the direct drive drum 4900.

There is an outer guide rail 4995 and an inner guide rail 4996, the outer guide rail 4995 being located further away from the drum rotation axis than the inner guide rail 4996. Between the outer guide rail and the inner guide rail there can be one or more further guide rails (not shown). The guide rails 4995 and 4996 independently from each other can have a particular cross-sectional profile selected from the group consisting of a rail in the form of a (classic) rail having a smooth running surface, a flat metal strip and an L profile.

There can be guide slots in the aforementioned profiles of the guide rails and/or in (the belt modules of) the modular conveyor belt, the guide slots in the guide rails receiving prongs or edges protruding from the belt modules of the modular conveyor belt, and/or the guide slots in (the belt modules of) the modular conveyor belt receiving the guide rails; said guide slots provide (additional) lateral guidance to the modular conveyor belt.

The L profile provides lateral guidance by itself (by acting) on the outer parts of the modular conveyor belt pointing away from the direct drive drum or its (circumferential) belt support surface(s), but for additional lateral guidance the L profile can feature guide slots, too.

In as far as FIGS. 1, 3 to 6 and 11 to 35 are concerned, these figures, when turned upside down and the description provided herein for these figures is read and applied in a corresponding manner, e.g. with the skirt section top end 152, 552, 652, 752, 852, 952 then being a skirt section bottom end, illustrate a further embodiment in which the skirt section 151, 551, 651, 751, 851, 951 as an upper skirt section is located in the upper part of the direct drive drum 100, 500, 600, 800, 900, 1000, 1100, 1200, 1300, 1400, 1500, 1600, 1700, 1800, 1900, 2000, 2100, 2200, with the modular conveyor belt 180 fed to and being engaged by the direct drive drum 100, 500, 600, 800, 900, 1000, 1100, 1200, 1300, 1400, 1500, 1600, 1700, 1800, 1900, 2000, 2100, 2200 in its upper part and upper skirt section, and being disengaged by and leaving the direct drive drum 100, 500, 600, 800, 900, 1000, 1100, 1200, 1300, 1400, 1500, 1600, 1700, 1800, 1900, 2000, 2100, 2200 in its lower part.

The invention claimed is:

1. A direct drive drum for a modular conveyor belt, the direct drive drum comprising:
   a drum rotation axis;
   a plurality of support elements, each support element having a belt support surface on a side distant and pointing away from the drum rotation axis; and
   a plurality of direct drive elements, characterised in that none of the direct drive elements comprises a belt support surface on a side distant and pointing away from the drum rotation axis and that each direct drive element is arranged in circumferential direction of the direct drive drum separate and in a distance from each of the support elements.

2. The direct drive drum according to claim 1, characterised in that the plurality of support elements defines an outermost circumferential belt support surface of the direct drive drum.

3. The direct drive drum according to claim 1, characterised in that both the support elements and the direct drive elements are arranged in circumferential direction of the direct drive drum in an alternating sequence with each support element followed next by 1 to 5 direct drive elements, preferably one direct drive element, and with each direct drive element followed next by 1 to 5 support elements, preferably one support element.

4. The direct drive drum according to claim 1, characterised in that each support element of the plurality of support elements is a bar or a plate and the belt support surface of each support element preferably is a flat surface or a convex surface.

5. The direct drive drum according to claim 1, characterised in that each direct drive element of the plurality of direct drive elements comprises a drive rib extending in a radial direction away from the drum rotation axis and/or protruding beyond an adjacent support element over at least a section of the direct drive drum.

6. The direct drive drum according to claim 1, comprising a lower skirt section extending upwards from a lower support end of the direct drive drum, the lower skirt section comprising a skirt section top end at a height lower than an upper support end of the direct drive drum, wherein in the lower skirt section the belt support surfaces of the support elements are arranged at an angle ($\alpha$) with respect to the drum rotation axis of from 0.5° to 30°, preferably of from 0.5° to 10°.

7. The direct drive drum according to claim 6, characterised in that at least some of the direct drive elements extend into the lower skirt section and/or into the upper skirt section.

8. The direct drive drum according to claim 1, comprising an upper skirt section extending downwards from an upper support end of the direct drive drum, wherein in the upper skirt section the belt support surfaces of the support elements are arranged at an angle with respect to the drum rotation axis of from 0.5° to 30°, preferably of from 0.5° to 10°.

9. The direct drive drum according to claim 8, characterised in that at least some of the direct drive elements extend into the lower skirt section and/or into the upper skirt section.

10. The direct drive drum according to claim 1, comprising a collapse section, in which no direct drive element protrudes in a radial direction away from the drum rotation axis beyond an adjacent support element, and an adjacent engagement section, in which a protrusion of at least one of the direct drive elements in a radial direction away from the drum rotation axis extends beyond an adjacent support element.

11. The direct drive drum according to claim 10, characterised in that the protrusion of at least one of the direct drive elements in a radial direction away from the drum rotation axis beyond an adjacent support element has a protrusion height (h) which increases in a direction away from the collapse section at least in a portion of the engagement section and/or decreases in a direction away from the collapse section at least in a portion of the engagement section.

12. The direct drive drum according to claim 10, characterised in that the direct drive drum comprises a direct drive section adjacent to the engagement section, in which the protrusion height (h) of at least one of the direct drive elements in a radial direction away from the drum rotation axis beyond an adjacent support element has a protrusion height (h) which is constant.

13. The direct drive drum according to claim 11, characterised in that the direct drive drum comprises a direct drive section adjacent to the engagement section, in which the protrusion height (h) of at least one of the direct drive elements in a radial direction away from the drum rotation axis beyond an adjacent support element has a protrusion height (h) which is constant.

14. The direct drive drum according to claim 1, characterised in that the direct drive drum comprises a disengagement section, in which no direct drive element protrudes in a radial direction away from the drum rotation axis beyond an adjacent support element.

15. A conveyor system comprising a direct drive drum as defined in claim 1 and a modular conveyor belt.

16. The conveyor Conveyer system according to claim 15, characterised in that
(i) at least some of the belt support surfaces of the support elements support the modular conveyor belt; and/or
(ii) at least some of the direct drive elements engage the modular conveyor belt in an engagement section and/or a direct drive section of the direct drive drum.

17. A method of manufacturing a direct drive drum for a modular conveyor belt according to claim 1, characterised by removing some support elements from a drum comprising a plurality of support elements and replacing each of the removed support elements by a direct drive element.

* * * * *